US012506884B2

(12) United States Patent
Filippov et al.

(10) Patent No.: US 12,506,884 B2
(45) Date of Patent: Dec. 23, 2025

(54) CODING UNIT PREDICTION USING TEMPLATE MATCHING COSTS

(71) Applicant: Comcast Cable Communications, LLC, Philadelphia, PA (US)

(72) Inventors: Alexey Konstantinovich Filippov, Khimki (RU); Vasily Alexeevich Rufitskiy, Vladimir (RU); Esmael Hejazi Dinan, McLean, VA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 79 days.

(21) Appl. No.: 18/534,421

(22) Filed: Dec. 8, 2023

(65) Prior Publication Data
US 2024/0195993 A1    Jun. 13, 2024

Related U.S. Application Data

(60) Provisional application No. 63/431,347, filed on Dec. 9, 2022.

(51) Int. Cl.
*H04N 19/186*    (2014.01)
*H04N 19/105*    (2014.01)
(Continued)

(52) U.S. Cl.
CPC ......... *H04N 19/186* (2014.11); *H04N 19/105* (2014.11); *H04N 19/136* (2014.11);
(Continued)

(58) Field of Classification Search
CPC .. H04N 19/186; H04N 19/105; H04N 19/136; H04N 19/156; H04N 19/176; H04N 19/50; H04N 19/147; H04N 19/577
(Continued)

(56) References Cited

U.S. PATENT DOCUMENTS 10,397,607 B2    8/2019   Kim et al.
10,401,366 B2    9/2019   Egry et al.
(Continued)

FOREIGN PATENT DOCUMENTS

CN    114503596 A  *  5/2022   .......... H04N 19/117
EP    3457696 A1       3/2019
(Continued)

OTHER PUBLICATIONS

JVET-AB0079-v1, Joint Video Experts Team (JVET) of ITU-T SG16 WP3 and ISO/IEC JTC 1/SC 29, 28th Meeting: Mainz, DE, Oct. 20-28, 2022, Source: Alibaba Group, Title: EE2-2.2: Template matching based BCW index derivation for merge mode.
(Continued)

*Primary Examiner* — Marnie A Matt
(74) *Attorney, Agent, or Firm* — Banner & Witcoff, Ltd.

(57) ABSTRACT

Template matching (TM) costs for a coding unit (CU) may be used to determine a bi-directional prediction with CU weights (BCW) weights to predict the CU. The TM cost may be determined based on templates of a block (e.g., a current block and/or a reference block). The TM cost may be determined based on one or more color component (e.g., collocated luma and chroma components) of the CU by calculating the TM cost as a weighted sum that may use the one or more color components.

20 Claims, 22 Drawing Sheets

(51) Int. Cl.
*H04N 19/136* (2014.01)
*H04N 19/156* (2014.01)
*H04N 19/176* (2014.01)
*H04N 19/50* (2014.01)

(52) U.S. Cl.
CPC ......... *H04N 19/156* (2014.11); *H04N 19/176* (2014.11); *H04N 19/50* (2014.11)

(58) Field of Classification Search
USPC .................................................... 375/240.15
See application file for complete search history.

(56) References Cited

U.S. PATENT DOCUMENTS

| | | | |
|---|---|---|---|
| 2016/0286230 A1 | 9/2016 | Li et al. | |
| 2017/0223379 A1 | 8/2017 | Chuang et al. | |
| 2018/0098070 A1* | 4/2018 | Chuang | H04N 19/51 |
| 2019/0215531 A1* | 7/2019 | Lee | H04N 19/577 |
| 2020/0374543 A1* | 11/2020 | Liu | H04N 19/147 |
| 2020/0374544 A1* | 11/2020 | Liu | H04N 19/186 |
| 2021/0250580 A1 | 8/2021 | Chen et al. | |
| 2021/0368198 A1* | 11/2021 | Zhang | H04N 19/176 |
| 2022/0030265 A1* | 1/2022 | Liu | H04N 19/147 |
| 2022/0182638 A1 | 6/2022 | Xu et al. | |
| 2022/0210434 A1 | 6/2022 | Wang et al. | |
| 2022/0239899 A1* | 7/2022 | Zhang | H04N 19/46 |
| 2022/0264086 A1* | 8/2022 | Zhang | H04N 19/70 |
| 2022/0368916 A1 | 11/2022 | Zhang et al. | |
| 2023/0131812 A1* | 4/2023 | Zhang | H04N 19/593 |
| | | | 375/240.12 |
| 2023/0135378 A1* | 5/2023 | Chen | H04N 19/105 |

FOREIGN PATENT DOCUMENTS

| | | | | |
|---|---|---|---|---|
| WO | 2019234673 A1 | 12/2019 | | |
| WO | WO-2020244545 A1 * | 12/2020 | ........... | H04N 19/117 |
| WO | WO-2024182669 A1 * | 9/2024 | ........... | H04N 19/105 |

OTHER PUBLICATIONS

Apr. 22, 2024—European Search Report—EP App. No. 23215327.0.

JVET-AB0140-v2, Joint Video Experts Team (JVET) of ITU-T SG 16 WP 3 and ISO/IEC JTC 1/SC 29 28th Meeting, Mainz, DE, Oct. 20-28, 2022, Source: Qualcomm Incorporated, Alibaba group, Title: EE2-2.4: Combined test of Test 2.2 and Test 2.3 on BCW weights derivation.

JVET-Ab2025, Joint Video Experts Team (JVET) of ITU-T SG 16 WP 3 and ISO/IEC JTC 1/SC 29 28th Meeting, Mainz, DE, Oct. 20-28, 2022, Source: Editors, Title: Algorithm Description of Enhanced Compression Model 7 (ECM 7).

* cited by examiner

CODING UNIT PREDICTION USING TEMPLATE MATCHING COSTS

CROSS-REFERENCE TO RELATED APPLICATIONS

The application claims the benefit of U.S. Provisional Application No. 63/431,347 filed on Dec. 9, 2022. The above-referenced application is hereby incorporated by reference in its entirety.

BACKGROUND

A computing device processes video for storage, transmission, reception, and/or display. Processing a video comprises encoding and/or decoding, for example, to reduce a data size associated with the video.

SUMMARY

The following summary presents a simplified summary of certain features. The summary is not an extensive overview and is not intended to identify key or critical elements.

Bidirectional prediction with coding unit weights (BCW) is a bi-prediction technique for predicting a block by weight-averaging two motion-compensated blocks. The BCW weight for a merge coded coding unit (CU) may be derived from a list of pre-defined candidate weights based on a template matching (TM) cost. The weight with a minimum TM cost may be selected, for example, as the BCW weight for a BCW prediction. The TM cost may be calculated, for example, based on templates (e.g., neighboring reconstructed samples) of a current block and/or a reference block. To improve accuracy of the BCW weight adjustments and improve compression performance, the TM cost may be determined based on more than one color component (e.g., collocated luma and chroma components) of the CU. The BCW weight may be determined based on TM costs that may be calculated using a weighted sum of the luma component and one or both chroma components.

These and other features and advantages are described in greater detail below.

BRIEF DESCRIPTION OF THE DRAWINGS

Examples of several of the various embodiments of the present disclosure are described herein with reference to the drawings.

DETAILED DESCRIPTION

Figure 1:
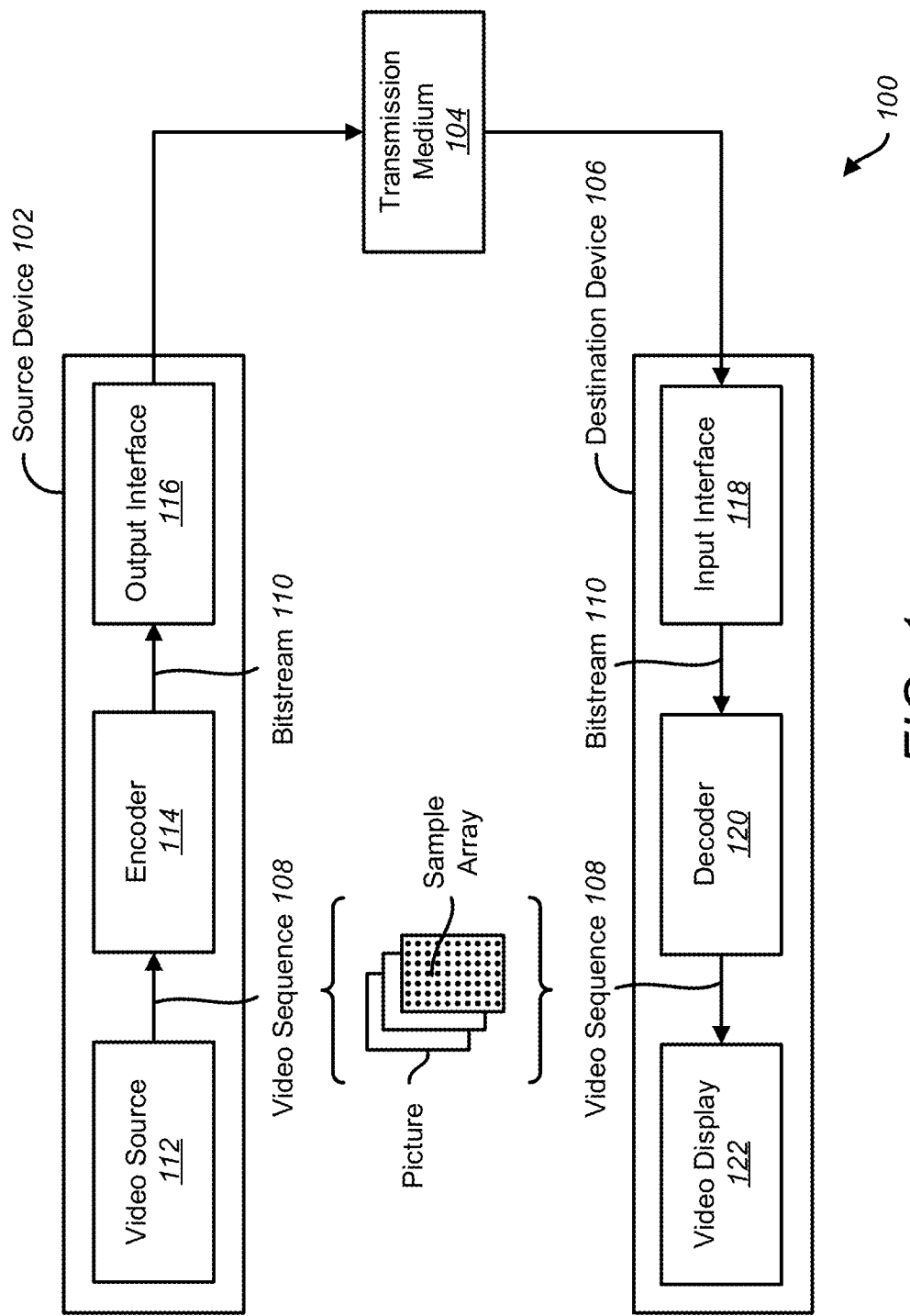
FIG. 1 shows an example video coding/decoding system.

The accompanying drawings and descriptions provide examples. It is to be understood that the examples shown in the drawings and/or described are non-exclusive, and that features shown and described may be practiced in other examples. Examples are provided for operation of video encoding and decoding systems, which may be used in the technical field of video data storage and/or transmission/reception. More particularly, the technology disclosed herein may relate to video compression as used in encoding and/or decoding devices and/or systems.

A video sequence, comprising multiple pictures/frames, may be represented in digital form for storage and/or transmission. Representing a video sequence in digital form may require a large quantity of bits. Large data sizes that may be associated with video sequences may require significant resources for storage and/or transmission. Video encoding may be used to compress a size of a video sequence for more efficient storage and/or transmission. Video decoding may be used to decompress a compressed video sequence for display and/or other forms of consumption.

FIG. 1 shows an example video coding/decoding system. Video coding/decoding system 100 may comprise a source device 102, a transmission medium 104, and a destination device 106. The source device 102 may encode a video sequence 108 into a bitstream 110 for more efficient storage and/or transmission. The source device 102 may store and/or send/transmit the bitstream 110 to the destination device 106 via the transmission medium 104. The destination device 106 may decode the bitstream 110 to display the video sequence 108. The destination device 106 may receive the bitstream 110 from the source device 102 via the transmission medium 104. The source device 102 and/or the destination device 106 may be any of a plurality of different devices (e.g., a desktop computer, laptop computer, tablet computer, smart phone, wearable device, television, camera, video gaming console, set-top box, video streaming device, etc.).

The source device 102 may comprise (e.g., for encoding the video sequence 108 into the bitstream 110) one or more of a video source 112, an encoder 114, and/or an output interface 116. The video source 112 may provide and/or generate the video sequence 108 based on a capture of a natural scene and/or a synthetically generated scene. A synthetically generated scene may be a scene comprising computer generated graphics and/or screen content. The video source 112 may comprise a video capture device (e.g., a video camera), a video archive comprising previously captured natural scenes and/or synthetically generated scenes, a video feed interface to receive captured natural scenes and/or synthetically generated scenes from a video content provider, and/or a processor to generate synthetic scenes.

A video sequence, such as video sequence 108, may comprise a series of pictures (also referred to as frames). A video sequence may achieve an impression of motion based on successive presentation of pictures of the video sequence using a constant time interval or variable time intervals between the pictures. A picture may comprise one or more sample arrays of intensity values. The intensity values may be taken (e.g., measured, determined, provided) at a series of regularly spaced locations within a picture. A color picture may comprise (e.g., typically comprises) a luminance sample array and two chrominance sample arrays. The luminance sample array may comprise intensity values representing the brightness (e.g., luma component, Y) of a picture. The chrominance sample arrays may comprise intensity values that respectively represent the blue and red components of a picture (e.g., chroma components, Cb and Cr) separate from the brightness. Other color picture sample arrays may be possible based on different color schemes (e.g., a red, green, blue (RGB) color scheme). A pixel, in a color picture, may refer to/comprise/be associated with all intensity values (e.g., luma component, chroma components), for a given location, in the sample arrays used to represent color pictures. A monochrome picture may comprise a single, luminance sample array. A pixel, in a monochrome picture, may refer to/comprise/be associated with the intensity value (e.g., luma component) at a given location in the single, luminance sample array used to represent monochrome pictures.

The encoder 114 may encode the video sequence 108 into the bitstream 110. The encoder 114 may apply/use (e.g., to encode the video sequence 108) one or more prediction techniques to reduce redundant information in the video sequence 108. Redundant information may comprise information that may be predicted at a decoder and need not be transmitted to the decoder for accurate decoding of the video sequence 108. For example, the encoder 114 may apply spatial prediction (e.g., intra-frame or intra prediction), temporal prediction (e.g., inter-frame prediction or inter prediction), inter-layer prediction, and/or other prediction techniques to reduce redundant information in the video sequence 108. The encoder 114 may partition pictures comprising the video sequence 108 into rectangular regions referred to as blocks, for example, prior to applying one or more prediction techniques. The encoder 114 may then encode a block using the one or more of the prediction techniques.

The encoder 114 may search for a block similar to the block being encoded in another picture (e.g., a reference picture) of the video sequence 108, for example, for temporal prediction. The block determined during the search (e.g., a prediction block) may then be used to predict the block being encoded. The encoder 114 may form a prediction block based on data from reconstructed neighboring samples of the block to be encoded within the same picture of the video sequence 108, for example, for spatial prediction. A reconstructed sample may be a sample that was encoded and then decoded. The encoder 114 may determine a prediction error (e.g., a residual) based on the difference between a block being encoded and a prediction block. The prediction error may represent non-redundant information that may be sent/transmitted to a decoder for accurate decoding of the video sequence 108.

The encoder 114 may apply a transform to the prediction error (e.g. using a discrete cosine transform (DCT), or any other transform) to generate transform coefficients. The encoder 114 may form the bitstream 110 based on the transform coefficients and other information used to determine prediction blocks using/based on prediction types, motion vectors, and prediction modes. The encoder 114 may perform one or more of quantization and entropy coding of the transform coefficients and/or the other information used to determine the prediction blocks, for example, prior to forming the bitstream 110. The quantization and/or the entropy coding may further reduce the quantity of bits needed to store and/or transmit the video sequence 108.

The output interface 116 may be configured to write and/or store the bitstream 110 onto the transmission medium 104 for transmission to the destination device 106. The output interface 116 may be configured to send/transmit, upload, and/or stream the bitstream 110 to the destination device 106 via the transmission medium 104. The output interface 116 may comprise a wired and/or a wireless transmitter configured to send/transmit, upload, and/or stream the bitstream 110 in accordance with one or more proprietary, open-source, and/or standardized communication protocols (e.g., Digital Video Broadcasting (DVB) standards, Advanced Television Systems Committee (ATSC) standards, Integrated Services Digital Broadcasting (ISDB) standards, Data Over Cable Service Interface Specification (DOCSIS) standards, 3rd Generation Partnership Project (3GPP) standards, Institute of Electrical and Electronics Engineers (IEEE) standards, Internet Protocol (IP) standards, Wireless Application Protocol (WAP) standards, and/or any other communication protocol).

The transmission medium 104 may comprise wireless, wired, and/or computer readable medium. For example, the transmission medium 104 may comprise one or more wires, cables, air interfaces, optical discs, flash memory, and/or magnetic memory. The transmission medium 104 may comprise one or more networks (e.g., the internet) or file servers configured to store and/or send/transmit encoded video data.

The destination device 106 may decode the bitstream 110 into the video sequence 108 for display. The destination device 106 may comprise one or more of an input interface 118, a decoder 120, and/or a video display 122. The input interface 118 may be configured to read the bitstream 110 stored on the transmission medium 104 by the source device 102. The input interface 118 may be configured to receive, download, and/or stream the bitstream 110 from the source device 102 via the transmission medium 104. The input interface 118 may comprise a wired and/or a wireless receiver configured to receive, download, and/or stream the bitstream 110 in accordance with one or more proprietary, open-source, standardized communication protocols, and/or any other communication protocol (e.g., such as referenced herein).

The decoder 120 may decode the video sequence 108 from the encoded bitstream 110. The decoder 120 may generate prediction blocks for pictures of the video sequence 108 in a similar manner as the encoder 114 and determine the prediction errors for the blocks, for example, to decode the video sequence 108. The decoder 120 may generate the prediction blocks using/based on prediction types, prediction modes, and/or motion vectors received in the bitstream 110. The decoder 120 may determine the prediction errors using the transform coefficients received in the bitstream 110. The decoder 120 may determine the prediction errors by weighting transform basis functions using the transform coefficients. The decoder 120 may combine the prediction blocks and the prediction errors to decode the video sequence 108. The video sequence 108 at the destination device 106 may be, or may not necessarily be, the same video sequence sent, such as the video sequence 108 as sent by the source device 102. The decoder 120 may decode a video sequence that approximates the video sequence 108, for example, because of lossy compression of the video sequence 108 by the encoder 114 and/or errors introduced into the encoded bitstream 110 during transmission to the destination device 106.

The video display 122 may display the video sequence 108 to a user. The video display 122 may comprise a cathode rate tube (CRT) display, a liquid crystal display (LCD), a plasma display, a light emitting diode (LED) display, and/or any other display device suitable for displaying the video sequence 108.

The video encoding/decoding system 100 is merely an example and video encoding/decoding systems different from the video encoding/decoding system 100 and/or modified versions of the video encoding/decoding system 100 may perform the methods and processes as described herein. For example, the video encoding/decoding system 100 may comprise other components and/or arrangements. The video source 112 may be external to the source device 102. The video display device 122 may be external to the destination device 106 or omitted altogether (e.g., if the video sequence 108 is intended for consumption by a machine and/or storage device). The source device 102 may further comprise a video decoder and the destination device 104 may further comprise a video encoder. For example, the source device 102 may be configured to further receive an encoded bit stream from the destination device 106 to support two-way video transmission between the devices.

The encoder 114 and/or the decoder 120 may operate according to one or more proprietary or industry video coding standards. For example, the encoder 114 and/or the decoder 120 may operate in accordance with one or more proprietary, open-source, and/or standardized protocols (e.g., International Telecommunications Union Telecommunication Standardization Sector (ITU-T) H.263, ITU-T H.264 and Moving Picture Expert Group (MPEG)-4 Visual (also known as Advanced Video Coding (AVC)), ITU-T H.265 and MPEG-H Part 2 (also known as High Efficiency Video Coding (HEVC)), ITU-T H.265 and MPEG-I Part 3 (also known as Versatile Video Coding (VVC)), the WebM VP8 and VP9 codecs, and/or AOMedia Video 1 (AV1), and/or any other video coding protocol).

Figure 2:
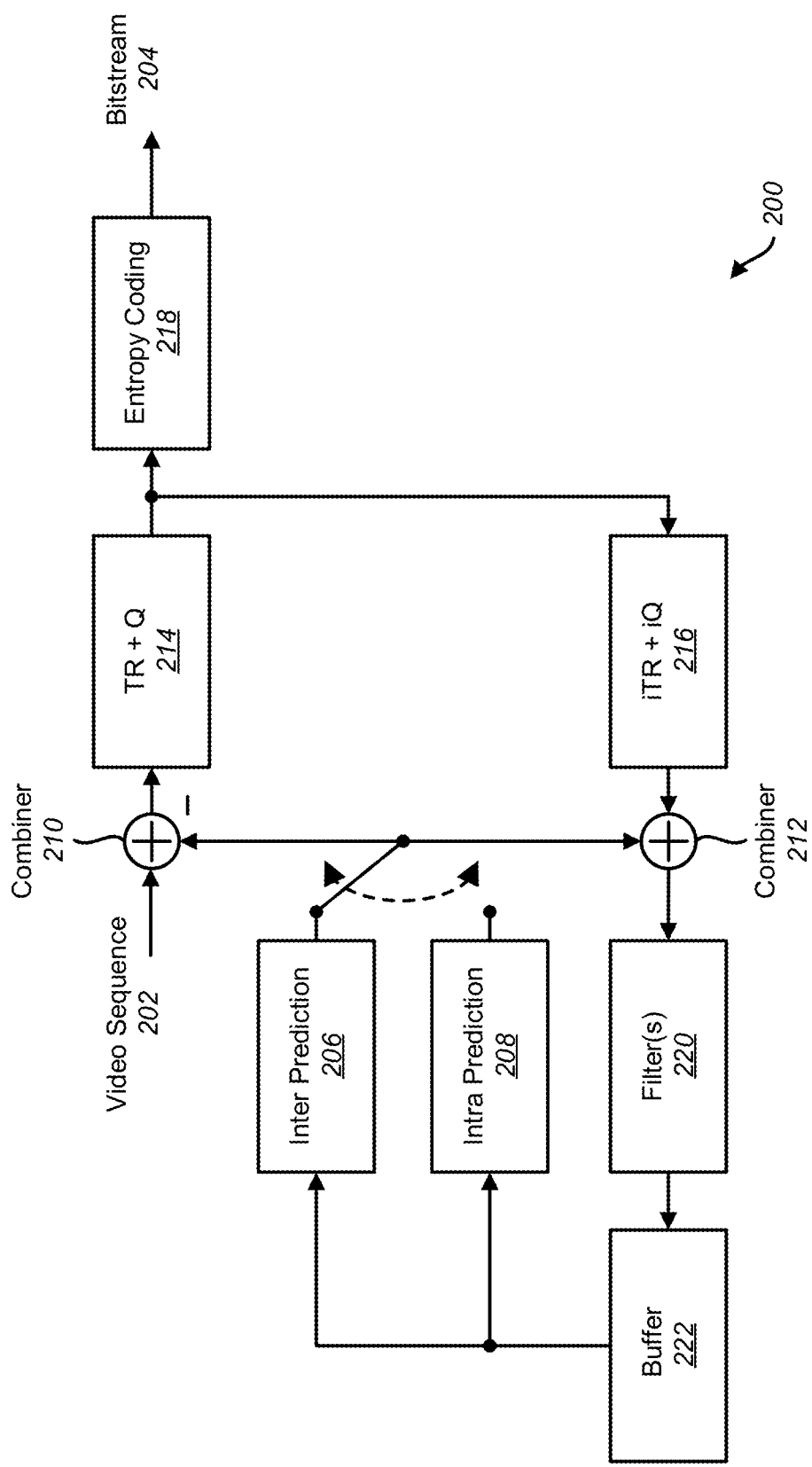
FIG. 2 shows an example encoder.

FIG. 2 shows an example encoder. The encoder 200 as shown in FIG. 2 may implement one or more processes described herein. The encoder 200 may encode a video sequence 202 into a bitstream 204 for more efficient storage and/or transmission. The encoder 200 may be implemented in the video coding/decoding system 100 as shown in FIG. 1 (e.g., as the encoder 114) or in any computing, communication, or electronic device (e.g., desktop computer, laptop computer, tablet computer, smart phone, wearable device, television, camera, video gaming console, set-top box, video streaming device, etc.). The encoder 200 may comprise one or more of an inter prediction unit 206, an intra prediction unit 208, combiners 210 and 212, a transform and quantization unit (TR+Q) 214, an inverse transform and quantization unit (iTR+iQ) 216, an entropy coding unit 218, one or more filters 220, and/or a buffer 222.

The encoder 200 may partition pictures (e.g., frames) of (e.g., comprising) the video sequence 202 into blocks and encode the video sequence 202 on a block-by-block basis. The encoder 200 may perform/apply a prediction technique on a block being encoded using either the inter prediction unit 206 or the intra prediction unit 208. The inter prediction unit 206 may perform inter prediction by searching for a block similar to the block being encoded in another, reconstructed picture (e.g., a reference picture) of the video sequence 202. The reconstructed picture may be a picture that was encoded and then decoded. The block determined during the search (e.g., a prediction block) may then be used to predict the block being encoded to remove redundant information. The inter prediction unit 206 may exploit temporal redundancy or similarities in scene content from picture to picture in the video sequence 202 to determine the prediction block. For example, scene content between pictures of the video sequence 202 may be similar except for differences due to motion and/or affine transformation of the screen content over time.

The intra prediction unit 208 may perform intra prediction by forming a prediction block based on data from reconstructed neighboring samples of the block to be encoded within the same picture of the video sequence 202. The reconstructed sample may be a sample that was encoded and then decoded. The intra prediction unit 208 may exploit spatial redundancy or similarities in scene content within a picture of the video sequence 202 to determine the prediction block. For example, the texture of a region of scene content in a picture may be similar to the texture in the immediate surrounding area of the region of the scene content in the same picture.

The combiner 210 may determine a prediction error (e.g., a residual) based on the difference between the block being encoded and the prediction block. The prediction error may represent non-redundant information that may be sent/transmitted to a decoder for accurate decoding of the video sequence 202.

The transform and quantization unit (TR+Q) 214 may transform and quantize the prediction error. The transform and quantization unit 214 may transform the prediction error into transform coefficients by applying, for example, a DCT to reduce correlated information in the prediction error. The transform and quantization unit 214 may quantize the coefficients by mapping data of the transform coefficients to a predefined set of representative values. The transform and quantization unit 214 may quantize the coefficients to reduce irrelevant information in the bitstream 204. The Irrelevant information may be information that may be removed from the coefficients without producing visible and/or perceptible distortion in the video sequence 202 after decoding (e.g., at a receiving device).

The entropy coding unit 218 may apply one or more entropy coding methods to the quantized transform coefficients to further reduce the bit rate. For example, the entropy coding unit 218 may apply context adaptive variable length coding (CAVLC), context adaptive binary arithmetic coding (CABAC), and/or syntax-based context-based binary arithmetic coding (SBAC). The entropy coded coefficients may be packed to form the bitstream 204.

The inverse transform and quantization unit (iTR+iQ) 216 may inverse quantize and inverse transform the quantized transform coefficients to determine a reconstructed prediction error. The combiner 212 may combine the reconstructed prediction error with the prediction block to form a reconstructed block. The filter(s) 220 may filter the reconstructed block, for example, using a deblocking filter and/or a sample-adaptive offset (SAO) filter. The buffer 222 may store the reconstructed block for prediction of one or more other blocks in the same and/or different picture of the video sequence 202.

The encoder 200 may further comprise an encoder control unit. The encoder control unit may be configured to control one or more units of the encoder 200 as shown in FIG. 2. The encoder control unit may control the one or more units of the encoder 200 such that the bitstream 204 may be generated in conformance with the requirements of one or more proprietary coding protocols, industry video coding standards, and/or any other video cording protocol. For example, the encoder control unit may control the one or more units of the encoder 200 such that bitstream 204 may be generated in conformance with one or more of ITU-T H.263, AVC, HEVC, VVC, VP8, VP9, AV1, and/or any other video coding standard/format.

The encoder control unit may attempt to minimize (or reduce) the bitrate of bitstream 204 and/or maximize (or increase) the reconstructed video quality (e.g., within the constraints of a proprietary coding protocol, industry video coding standard, and/or any other video cording protocol). For example, the encoder control unit may attempt to minimize or reduce the bitrate of bitstream 204 such that the reconstructed video quality may not fall below a certain level/threshold, and/or may attempt to maximize or increase the reconstructed video quality such that the bit rate of bitstream 204 may not exceed a certain level/threshold. The encoder control unit may determine/control one or more of: partitioning of the pictures of the video sequence 202 into blocks, whether a block is inter predicted by the inter prediction unit 206 or intra predicted by the intra prediction unit 208, a motion vector for inter prediction of a block, an intra prediction mode among a plurality of intra prediction modes for intra prediction of a block, filtering performed by the filter(s) 220, and/or one or more transform types and/or quantization parameters applied by the transform and quantization unit 214. The encoder control unit may determine/control one or more of the above based on a rate-distortion measure for a block or picture being encoded. The encoder control unit may determine/control one or more of the above to reduce the rate-distortion measure for a block or picture being encoded.

The prediction type used to encode a block (intra or inter prediction), prediction information of the block (intra prediction mode if intra predicted, motion vector, etc.), and/or transform and/or quantization parameters, may be sent to the entropy coding unit 218 to be further compressed (e.g., to reduce the bit rate). The prediction type, prediction information, and/or transform and/or quantization parameters may be packed with the prediction error to form the bitstream 204.

The encoder 200 is merely an example and encoders different from the encoder 200 and/or modified versions of the encoder 200 may perform the methods and processes as described herein. For example, the encoder 200 may comprise other components and/or arrangements. One or more of the components shown in FIG. 2 may be optionally included in the encoder 200 (e.g., the entropy coding unit 218 and/or the filters(s) 220).

Figure 3:
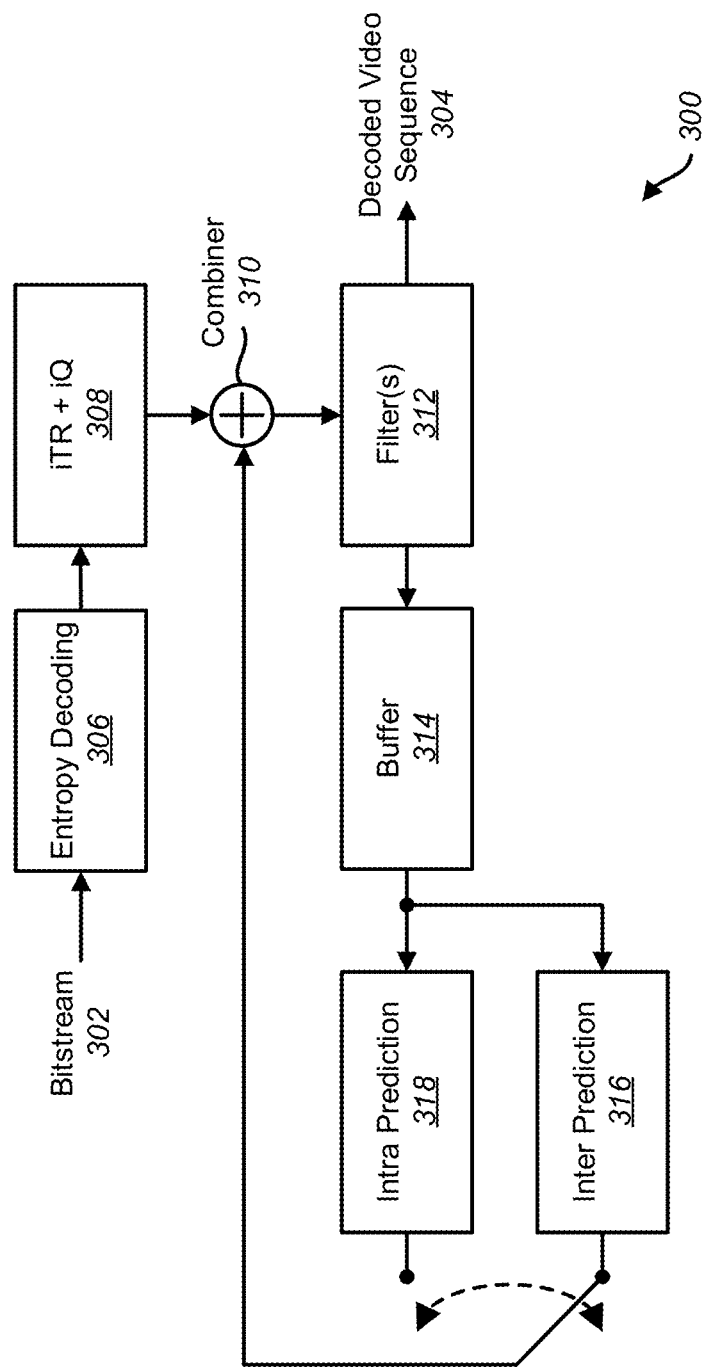
FIG. 3 shows an example decoder.

FIG. 3 shows an example decoder. A decoder 300 as shown in FIG. 3 may implement one or more processes described herein. The decoder 300 may decode a bitstream 302 into a decoded video sequence 304 for display and/or some other form of consumption. The decoder 300 may be implemented in the video encoding/decoding system 100 in FIG. 1 and/or in a computing, communication, or electronic device (e.g., desktop computer, laptop computer, tablet computer, smart phone, wearable device, television, camera, video gaming console, set-top box, and/or video streaming device). The decoder 300 may comprise an entropy decoding unit 306, an inverse transform and quantization (iTR+iQ) unit 308, a combiner 310, one or more filters 312, a buffer 314, an inter prediction unit 316, and/or an intra prediction unit 318.

The decoder 300 may comprise a decoder control unit configured to control one or more units of decoder 300. The decoder control unit may control the one or more units of decoder 300 such that the bitstream 302 is decoded in conformance with the requirements of one or more proprietary coding protocols, industry video coding standards, and/or any other communication protocol. For example, the decoder control unit may control the one or more units of decoder 300 such that the bitstream 302 is decoded in conformance with one or more of ITU-T H.263, AVC, HEVC, VVC, VP8, VP9, AV1, and/or any other video coding standard/format.

The decoder control unit may determine/control one or more of: whether a block is inter predicted by the inter prediction unit 316 or intra predicted by the intra prediction unit 318, a motion vector for inter prediction of a block, an intra prediction mode among a plurality of intra prediction modes for intra prediction of a block, filtering performed by the filter(s) 312, and/or one or more inverse transform types and/or inverse quantization parameters to be applied by the inverse transform and quantization unit 308. One or more of the control parameters used by the decoder control unit may be packed in bitstream 302.

The Entropy decoding unit 306 may entropy decode the bitstream 302. The inverse transform and quantization unit 308 may inverse quantize and/or inverse transform the quantized transform coefficients to determine a decoded prediction error. The combiner 310 may combine the decoded prediction error with a prediction block to form a decoded block. The prediction block may be generated by the intra prediction unit 318 or the inter prediction unit 316 (e.g., as described above with respect to encoder 200 in FIG. 2). The filter(s) 312 may filter the decoded block, for example, using a deblocking filter and/or a sample-adaptive offset (SAO) filter. The buffer 314 may store the decoded block for prediction of one or more other blocks in the same and/or different picture of the video sequence in the bitstream 302. The decoded video sequence 304 may be output from the filter(s) 312 as shown in FIG. 3.

The decoder 300 is merely an example and decoders different from the decoder 300 and/or modified versions of the decoder 300 may perform the methods and processes as described herein. For example, the decoder 300 may have other components and/or arrangements. One or more of the components shown in FIG. 3 may be optionally included in the decoder 300 (e.g., the entropy decoding unit 306 and/or the filters(s) 312).

Although not shown in FIGS. 2 and 3, each of the encoder 200 and the decoder 300 may further comprise an intra block copy unit in addition to inter prediction and intra prediction units. The intra block copy unit may perform/operate similar to an inter prediction unit but may predict blocks within the same picture. For example, the intra block copy unit may exploit repeated patterns that appear in screen content. The screen content may include computer generated text, graphics, animation, etc.

Video encoding and/or decoding may be performed on a block-by-block basis. The process of partitioning a picture into blocks may be adaptive based on the content of the picture. For example, larger block partitions may be used in areas of a picture with higher levels of homogeneity to improve coding efficiency.

A picture (e.g., in HEVC, or any other coding standard/format) may be partitioned into non-overlapping square blocks, which may be referred to as coding tree blocks (CTBs). The CTBs may comprise samples of a sample array. A CTB may have a size of 2n×2n samples, where n may be specified by a parameter of the encoding system. For example, n may be 4, 5, 6, or any other value. A CTB may have any other size. A CTB may be further partitioned by a recursive quadtree partitioning into coding blocks (CBs) of half vertical and half horizontal size. The CTB may form the root of the quadtree. A CB that is not split further as part of the recursive quadtree partitioning may be referred to as a leaf CB of the quadtree, and otherwise may be referred to as a non-leaf CB of the quadtree. A CB may have a minimum size specified by a parameter of the encoding system. For example, a CB may have a minimum size of 4×4, 8×8, 16×16, 32×32, 64×64 samples, or any other minimum size. A CB may be further partitioned into one or more prediction blocks (PBs) for performing inter and/or intra prediction. A PB may be a rectangular block of samples on which the same prediction type/mode may be applied. For transformations, a CB may be partitioned into one or more transform blocks (TBs). A TB may be a rectangular block of samples that may determine/indicate an applied transform size.

Figure 4:
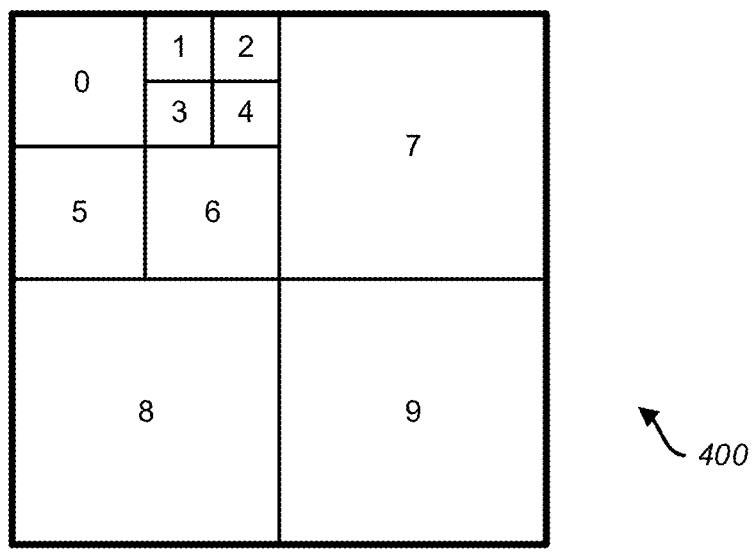
FIG. 4 shows an example quadtree partitioning of a coding tree block (CTB).
Figure 5:
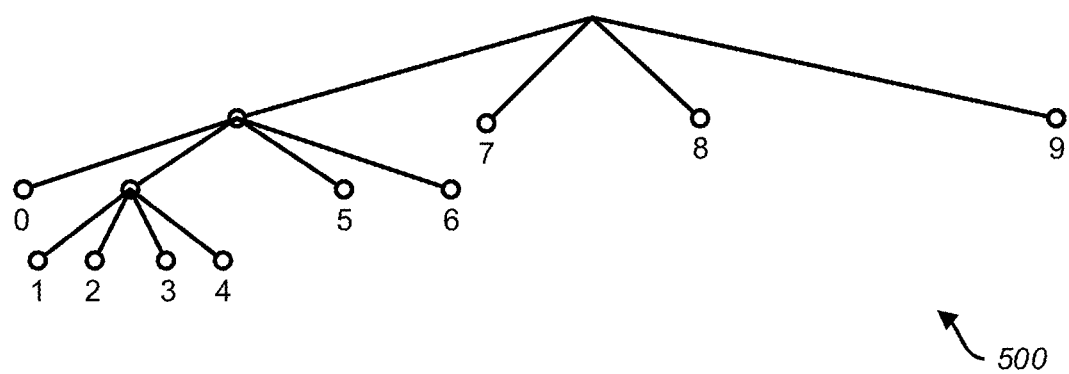
FIG. 5 shows an example quadtree corresponding to the example quadtree partitioning of the CTB in FIG. 4.

FIG. 4 shows an example quadtree partitioning of a CTB. FIG. 5 shows a quadtree corresponding to the example quadtree partitioning of the CTB 400 in FIG. 4. As shown in FIGS. 4 and 5, the CTB 400 may first be partitioned into four CBs of half vertical and half horizontal size. Three of the resulting CBs of the first level partitioning of CTB 400 may be leaf CBs. The three leaf CBs of the first level partitioning of CTB 400 are respectively labeled 7, 8, and 9 in FIGS. 4 and 5. The non-leaf CB of the first level partitioning of CTB 400 may be partitioned into four sub-CBs of half vertical and half horizontal size. Three of the resulting sub-CBs of the second level partitioning of CTB 400 may be leaf CBs. The three leaf CBs of the second level partitioning of CTB 400 are respectively labeled 0, 5, and 6 in FIGS. 4 and 5. The non-leaf CB of the second level partitioning of CTB 400 may be partitioned into four leaf CBs of half vertical and half horizontal size. The four leaf CBs may be respectively labeled 1, 2, 3, and 4 in FIGS. 4 and 5.

The CTB 400 of FIG. 4 may be partitioned into 10 leaf CBs respectively labeled 0-9, and/or any other quantity of leaf CBs. The 10 leaf CBs may correspond to 10 CB leaf nodes (e.g., 10 CB leaf nodes of the quadtree 500 as shown in FIG. 5). In other examples, a CTB may be partitioned into a different number of leaf CBs. The resulting quadtree partitioning of the CTB 400 may be scanned using a z-scan (e.g., left-to-right, top-to-bottom) to form the sequence order for encoding/decoding the CB leaf nodes. A numeric label (e.g., indicator, index) of each CB leaf node in FIGS. 4 and 5 may correspond to the sequence order for encoding/decoding. For example, CB leaf node 0 may be encoded/decoded first and CB leaf node 9 may be encoded/decoded last. Although not shown in FIGS. 4 and 5, each CB leaf node may comprise one or more PBs and/or TBs.

A picture, in VVC (or in any other coding standard/format), may be partitioned in a similar manner (such as in HEVC). A picture may be first partitioned into non-overlapping square CTBs. The CTBs may then be partitioned, using a recursive quadtree partitioning, into CBs of half vertical and half horizontal size. A quadtree leaf node (e.g., in VVC) may be further partitioned by a binary tree or ternary tree partitioning (or any other partitioning) into CBs of unequal sizes.

Figure 6:
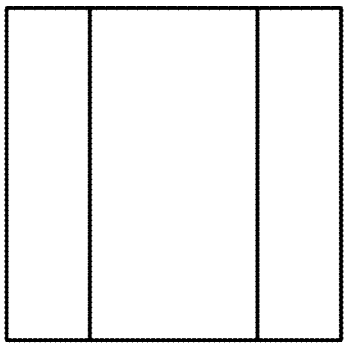
FIG. 6 shows example binary tree and ternary tree partitions.
Figure 6:
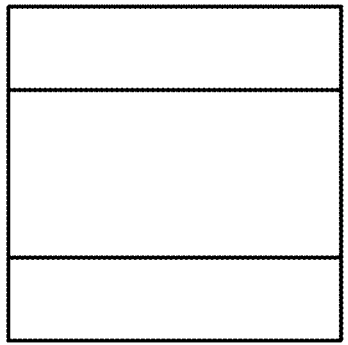
Figure 6:
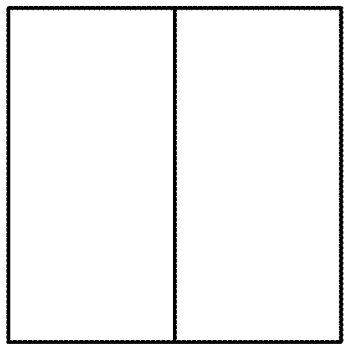
Figure 6:
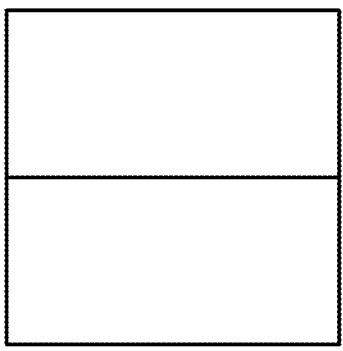

FIG. 6 shows example binary tree and ternary tree partitions. A binary tree partition may divide a parent block in half in either a vertical direction 602 or a horizontal direction 604. The resulting partitions may be half in size as compared to the parent block. The resulting partitions may correspond to sizes that are less than and/or greater than half of the parent block size. A ternary tree partition may divide a parent block into three parts in either a vertical direction 606 or a horizontal direction 608. FIG. 6 shows an example in which the middle partition may be twice as large as the other two end partitions in the ternary tree partitions. In other examples, partitions may be of other sizes relative to each other and to the parent block. Binary and ternary tree partitions are examples of multi-type tree partitioning. Multi-type tree partitions may comprise partitioning a parent block into other quantities of smaller blocks. The block partitioning strategy (e.g., in VVC) may be referred to as a combination of quadtree and multi-type tree partitioning (quadtree+multi-type tree partitioning) because of the addition of binary and/or ternary tree partitioning to quadtree partitioning.

Figure 7:
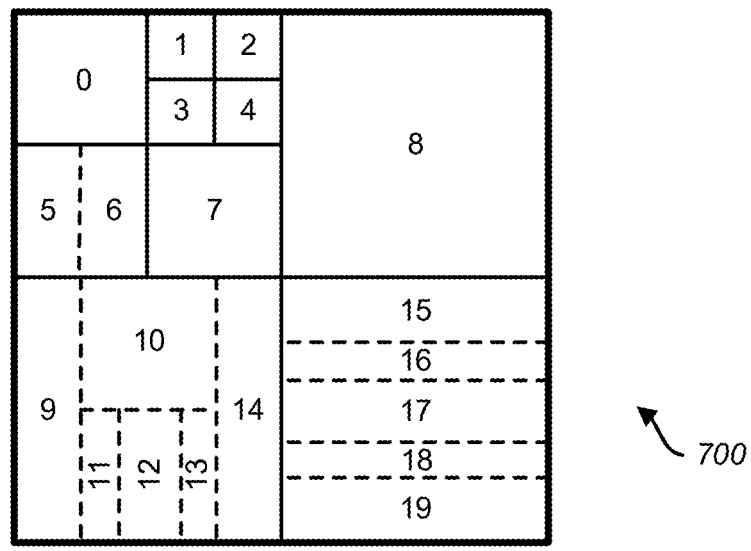
FIG. 7 shows an example of combined quadtree and multi-type tree partitioning of a CTB.
Figure 8:
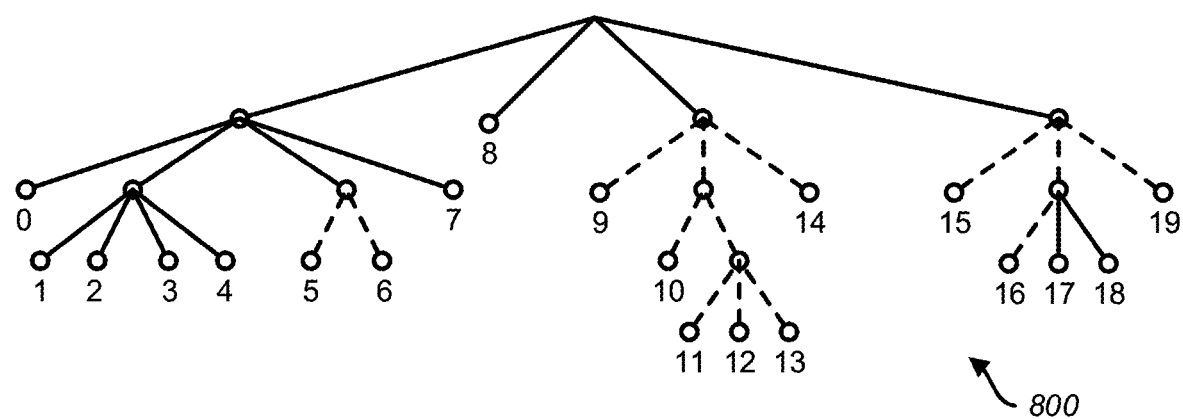
FIG. 8 shows a tree corresponding to the combined quadtree and multi-type tree partitioning of the CTB shown in FIG. 7.

FIG. 7 shows an example of combined quadtree and multi-type tree partitioning of a CTB. FIG. 8 shows a tree corresponding to the combined quadtree and multi-type tree partitioning of the CTB 700 shown in FIG. 7. In both FIGS. 7 and 8, quadtree splits are shown in solid lines and multi-type tree splits are shown in dashed lines. The CTB 700 is shown with the same quadtree partitioning as the CTB 400 described in FIG. 4, and a description of the quadtree partitioning of the CTB 700 is omitted. The quadtree partitioning of the CTB 700 is merely an example and a CTB may be quadtree partitioned in a manner different from the CTB 700. Additional multi-type tree partitions of the CTB 700 may be made relative to three leaf CBs shown in FIG. 4. The three leaf CBs in FIG. 4 that are shown in FIG. 7 as being further partitioned may be leaf CBs 5, 8, and 9. The three leaf CBs may be further partitioned using one or more binary and/or ternary tree partitions.

The leaf CB 5 of FIG. 4 may be partitioned into two CBs based on a vertical binary tree partitioning. The two resulting CBs may be leaf CBs respectively labeled 5 and 6 in FIGS. 7 and 8. The leaf CB 8 of FIG. 4 may be partitioned into three CBs based on a vertical ternary tree partition. Two of the three resulting CBs may be leaf CBs respectively labeled 9 and 14 in FIGS. 7 and 8. The remaining, non-leaf CB may be partitioned first into two CBs based on a horizontal binary tree partition. One of the two CBs may be a leaf CB labeled 10. The other of the two CBs may be further partitioned into three CBs based on a vertical ternary tree partition. The resulting three CBs may be leaf CBs respectively labeled 11, 12, and 13 in FIGS. 7 and 8. The leaf CB 9 of FIG. 4 may be partitioned into three CBs based on a horizontal ternary tree partition. Two of the three CBs may be leaf CBs respectively labeled 15 and 19 in FIGS. 7 and 8. The remaining, non-leaf CB may be partitioned into three CBs based on another horizontal ternary tree partition. The resulting three CBs may all be leaf CBs respectively labeled 16, 17, and 18 in FIGS. 7 and 8.

Altogether, the CTB 700 may be partitioned into 20 leaf CBs respectively labeled 0-19. The 20 leaf CBs may correspond to 20 leaf nodes (e.g., 20 leaf nodes of the tree 800 shown in FIG. 8). The resulting combination of quadtree and multi-type tree partitioning of the CTB 700 may be scanned using a z-scan (left-to-right, top-to-bottom) to form the sequence order for encoding/decoding the CB leaf nodes. A numeric label of each CB leaf node in FIGS. 7 and 8 may correspond to the sequence order for encoding/decoding, with CB leaf node 0 encoded/decoded first and CB leaf node 19 encoded/decoded last. Although not shown in FIGS. 7 and 8, it should be noted that each CB leaf node may comprise one or more PBs and/or TBs.

A coding standard/format (e.g., HEVC, VVC, or any other coding standard/format) may define various units (e.g., in addition to specifying various blocks (e.g., CTBs, CBs, PBs, TBs)). Blocks may comprise a rectangular area of samples in a sample array. Units may comprise the collocated blocks of samples from the different sample arrays (e.g., luma and chroma sample arrays) that form a picture as well as syntax elements and prediction data of the blocks. A coding tree unit (CTU) may comprise the collocated CTBs of the different sample arrays and may form a complete entity in an encoded bit stream. A coding unit (CU) may comprise the collocated CBs of the different sample arrays and syntax structures used to code the samples of the CBs. A prediction unit (PU) may comprise the collocated PBs of the different sample arrays and syntax elements used to predict the PBs. A transform unit (TU) may comprise TBs of the different samples arrays and syntax elements used to transform the TBs.

A block may refer to any of a CTB, CB, PB, TB, CTU, CU, PU, and/or TU (e.g., in the context of HEVC, VVC, or any other coding format/standard). A block may be used to refer to similar data structures in the context of any video coding format/standard/protocol. For example, a block may refer to a macroblock in the AVC standard, a macroblock or a sub-block in the VP8 coding format, a superblock or a sub-block in the VP9 coding format, and/or a superblock or a sub-block in the AV1 coding format.

Samples of a block to be encoded (e.g., a current block) may be predicted from samples of the column immediately adjacent to the left-most column of the current block and samples of the row immediately adjacent to the top-most row of the current block, such as in intra prediction. The samples from the immediately adjacent column and row may be jointly referred to as reference samples. Each sample of the current block may be predicted (e.g., in an intra prediction mode) by projecting the position of the sample in the current block in a given direction to a point along the reference samples. The sample may be predicted by interpolating between the two closest reference samples of the projection point if the projection does not fall directly on a reference sample. A prediction error (e.g., a residual) may be determined for the current block based on differences between the predicted sample values and the original sample values of the current block.

Predicting samples and determining a prediction error based on a difference between the predicted samples and original samples may be performed (e.g., at an encoder) for a plurality of different intra prediction modes (e.g., including non-directional intra prediction modes). The encoder may select one of the plurality of intra prediction modes and its corresponding prediction error to encode the current block. The encoder may send an indication of the selected prediction mode and its corresponding prediction error to a decoder for decoding of the current block. The decoder may decode the current block by predicting the samples of the current block, using the intra prediction mode indicated by the encoder, and/or combining the predicted samples with the prediction error.

Figure 9:
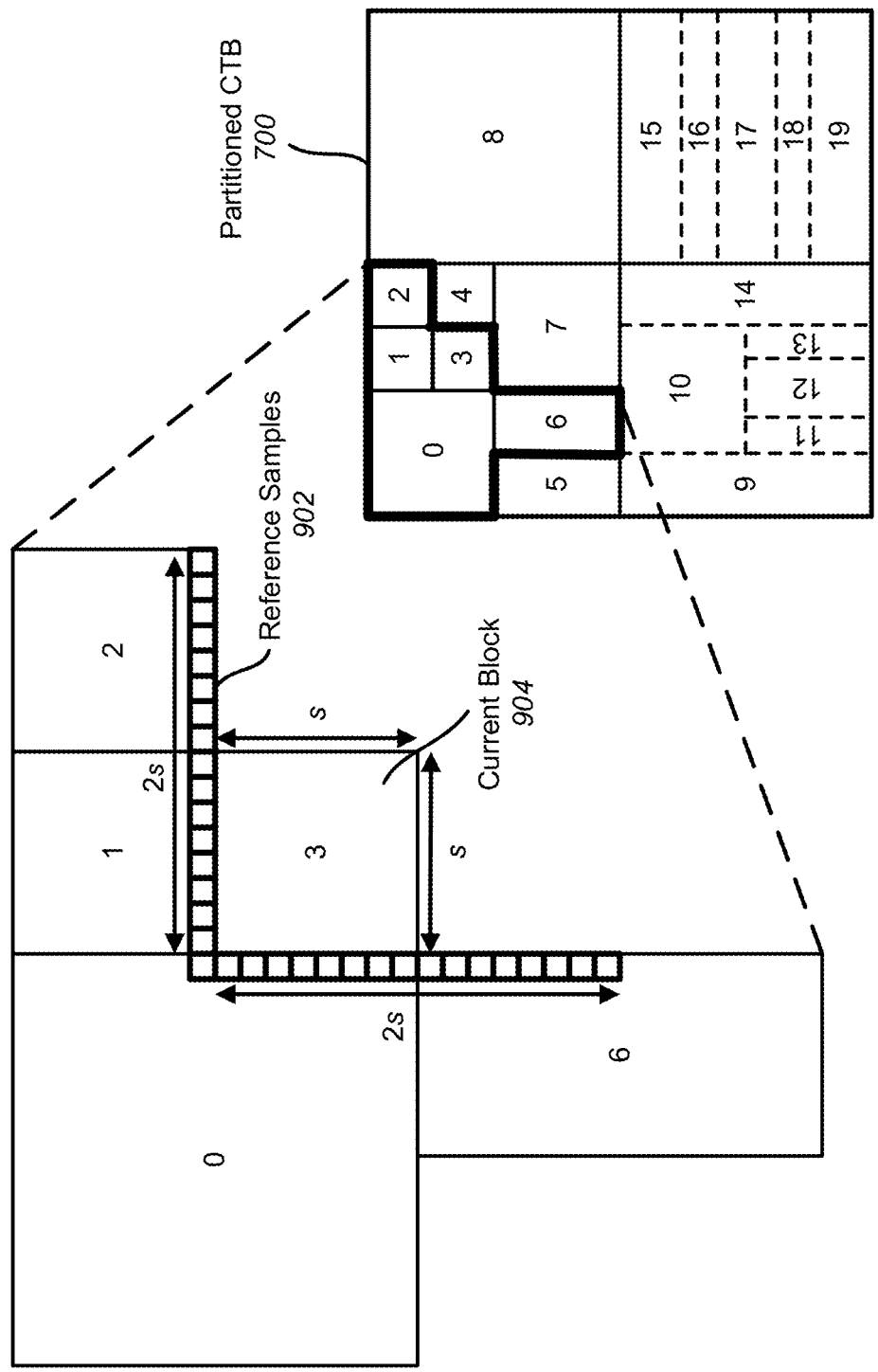
FIG. 9 shows an example set of reference samples determined for intra prediction of a current block.

FIG. 9 shows an example set of reference samples determined for intra prediction of a current block. The current block 904 may correspond to a block being encoded and/or decoded. The current block 904 may correspond to block 3 of the partitioned CTB 700 as shown in FIG. 7. As described herein, the numeric labels 0-19 of the blocks of partitioned CTB 700 may correspond to the sequence order for encoding/decoding the blocks and may be used as such in the example of FIG. 9.

The current block 904 may be w×h samples in size. The reference samples 902 may comprise: 2w samples (or any other quantity of samples) of the row immediately adjacent to the top-most row of the current block 904, 2 h samples (or any other quantity of samples) of the column immediately adjacent to the left-most column of the current block 904, and the top left neighboring corner sample to the current block 904. The current block 904 may be square, such that w=h=s. In other examples, a current block need not be square, such that w≠h. Available samples from neighboring blocks of the current block 904 may be used for constructing the set of reference samples 902. Samples may not be available for constructing the set of reference samples 902, for example, if the samples lie outside the picture of the current block, the samples are part of a different slice of the current block (e.g., if the concept of slices is used), and/or the samples belong to blocks that have been inter coded and constrained intra prediction is indicated. Intra prediction may not be dependent on inter predicted blocks, for example, if constrained intra prediction is indicated.

Samples that may not be available for constructing the set of reference samples 902 may comprise samples in blocks that have not already been encoded and reconstructed at an encoder and/or decoded at a decoder based on the sequence order for encoding/decoding. Restriction of such samples from inclusion in the set of reference samples 902 may allow identical prediction results to be determined at both the encoder and decoder. Samples from neighboring blocks 0, 1, and 2 may be available to construct the reference samples 902 given that these blocks are encoded and reconstructed at an encoder and decoded at a decoder prior to coding of the current block 904. The samples from neighboring blocks 0, 1, and 2 may be available to construct reference samples 902, for example, if there are no other issues (e.g., as mentioned above) preventing the availability of the samples from the neighboring blocks 0, 1, and 2. The portion of reference samples 902 from neighboring block 6 may not be available due to the sequence order for encoding/decoding (e.g., because the block 6 may not have already been encoded and reconstructed at the encoder and/or decoded at the decoder based on the sequence order for encoding/decoding).

Unavailable samples from the reference samples 902 may be filled with one or more of the available reference samples 902. For example, an unavailable reference sample may be filled with a nearest available reference sample. The nearest available reference sample may be determined by moving in a clock-wise direction through the reference samples 902 from the position of the unavailable reference. The reference samples 902 may be filled with the mid-value of the dynamic range of the picture being coded, for example, if no reference samples are available.

The reference samples 902 may be filtered based on the size of current block 904 being coded and an applied intra prediction mode. FIG. 9 shows an exemplary determination of reference samples for intra prediction of a block. Reference samples may be determined in a different manner than described above. For example, multiple reference lines may be used in other instances (e.g., in VVC).

Samples of the current block 904 may be intra predicted based on the reference samples 902, for example, based on (e.g., after) determination and (optionally) filtration of the reference samples. At least some (e.g., most) encoders/decoders may support a plurality of intra prediction modes in accordance with one or more video coding standards. For example, HEVC supports 35 intra prediction modes, including a planar mode, a direct current (DC) mode, and 33 angular modes. VVC supports 67 intra prediction modes, including a planar mode, a DC mode, and 65 angular modes. Planar and DC modes may be used to predict smooth and gradually changing regions of a picture. Angular modes may be used to predict directional structures in regions of a picture. Any quantity of intra prediction modes may be supported.

Figure 10A:
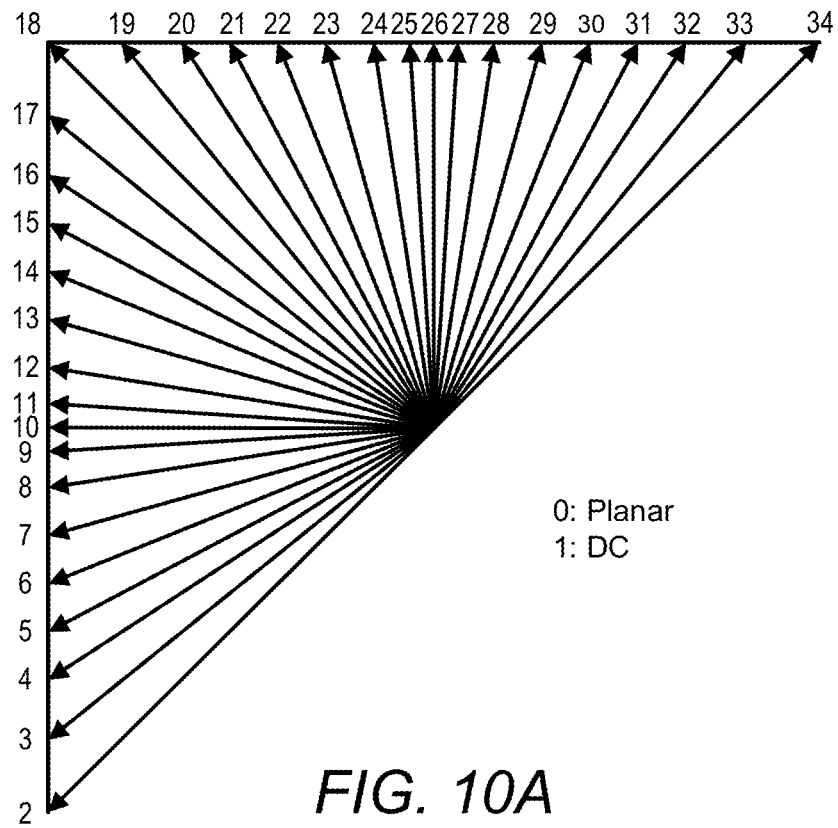
FIGS. 10A and 10B show example intra prediction modes.
Figure 10B:
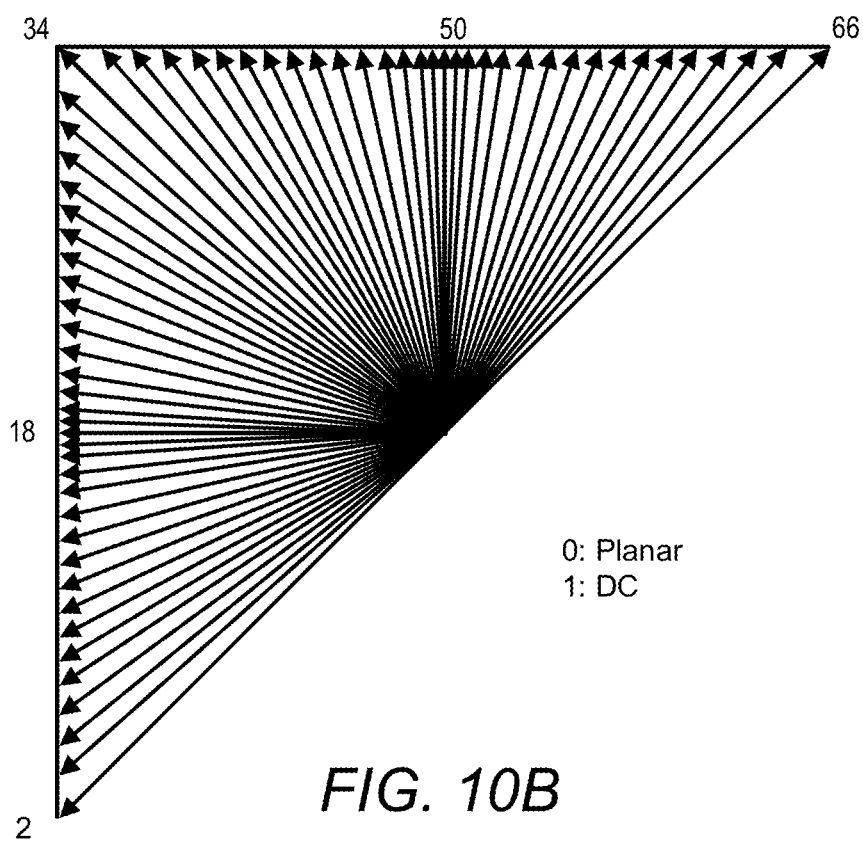

FIGS. 10A and 10B show example intra prediction modes. FIG. 10A shows 35 intra prediction modes, such as supported by HEVC. The 35 intra prediction modes may be indicated/identified by indices 0 to 34. Prediction mode 0 may correspond to planar mode. Prediction mode 1 may correspond to DC mode. Prediction modes 2-34 may correspond to angular modes. Prediction modes 2-18 may be referred to as horizontal prediction modes because the principal source of prediction is in the horizontal direction. Prediction modes 19-34 may be referred to as vertical prediction modes because the principal source of prediction is in the vertical direction.

FIG. 10B shows 67 intra prediction modes, such as supported by VVC. The 67 intra prediction modes may be indicated/identified by indices 0 to 66. Prediction mode 0 may correspond to planar mode. Prediction mode 1 corresponds to DC mode. Prediction modes 2-66 may correspond to angular modes. Prediction modes 2-34 may be referred to as horizontal prediction modes because the principal source of prediction is in the horizontal direction. Prediction modes 35-66 may be referred to as vertical prediction modes because the principal source of prediction is in the vertical direction. Some of the intra prediction modes illustrated in FIG. 10B may be adaptively replaced by wide-angle directions because blocks in VVC need not be squares.

Figure 11:
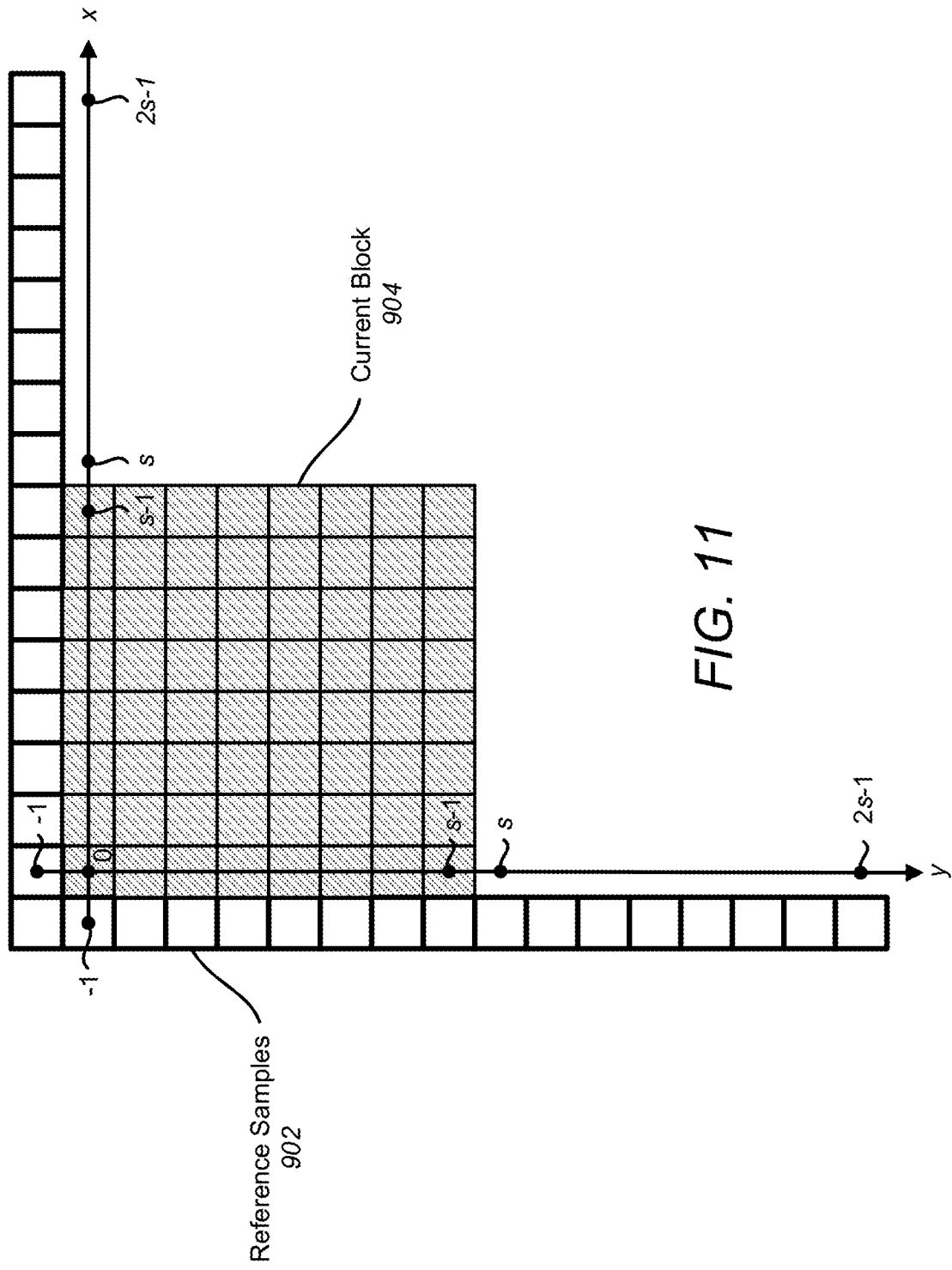
FIG. 11 shows a current block and corresponding reference samples.

FIG. 11 shows a current block and corresponding reference samples. In FIG. 11, the current block 904 and the reference samples 902 from FIG. 9 are shown in a two-dimensional x, y plane, where a sample may be referenced as p[x][y]. In order to simplify the prediction process, the reference samples 902 may be placed in two, one-dimensional arrays. The reference samples 902, above the current block 904, may be placed in the one-dimensional array $ref_1[x]$:

$$ref_1[x]=p[-1+x][-1], (x\geq 0). \quad (1)$$

The reference samples 902 to the left of the current block 904 may be placed in the one-dimensional array $ref_2[y]$:

$$ref_2[y]=p[-1][-1+y], (y\geq 0). \quad (2)$$

The prediction process may comprise determination of a predicted sample p[x][y] (e.g., a predicted value) at a location [x][y] in the current block 904. For planar mode, a sample at the location [x][y] in the current block 904 may be predicted by determining/calculating the mean of two interpolated values. The first of the two interpolated values may be based on a horizontal linear interpolation at the location [x][y] in the current block 904. The second of the two interpolated values may be based on a vertical linear interpolation at the location [x][y] in the current block 904. The predicted sample p[x][y] in the current block 904 may be determined/calculated as:

$$p[x][y] = \frac{1}{2 \cdot s}(h[x][y] + v[x][y] + s), \quad (3)$$

where $$h[x][y] = (s - x - 1) \cdot ref_2[y] + (x + 1) \cdot ref_1[s] \quad (4)$$

may be the horizontal linear interpolation at the location [x][y] in the current block 904 and $$v[x][y]=(s-y-1)\cdot ref_1[x]+(y+1)\cdot ref_2[s] \quad (5)$$

may be the vertical linear interpolation at the location [x][y] in the current block 904. s may be equal to a length of a side (e.g., a number of samples on a side) of the current block 904.

A sample at a location [x][y] in the current block 904 may be predicted by the mean of the reference samples 902, such as for a DC mode. The predicted sample p[x][y] in the current block 904 may be determined/calculated as:

$$p[x][y] = \frac{1}{2 \cdot s}\left(\sum_{x=0}^{s-1} ref_1[x] + \sum_{y=0}^{s-1} ref_2[y]\right). \quad (6)$$

A sample at a location [x][y] in the current block 904 may be predicted by projecting the location [x][y] in a direction specified by a given angular mode to a point on the horizontal or vertical line of samples comprising the reference samples 902, such as for an angular mode. The sample at the location [x][y] may be predicted by interpolating between the two closest reference samples of the projection point if the projection does not fall directly on a reference sample. The direction specified by the angular mode may be given by an angle φ defined relative to the y-axis for vertical prediction modes (e.g., modes 19-34 in HEVC and modes 35-66 in VVC). The direction specified by the angular mode may be given by an angle φ defined relative to the x-axis for horizontal prediction modes (e.g., modes 2-18 in HEVC and modes 2-34 in VVC).

Figure 12:
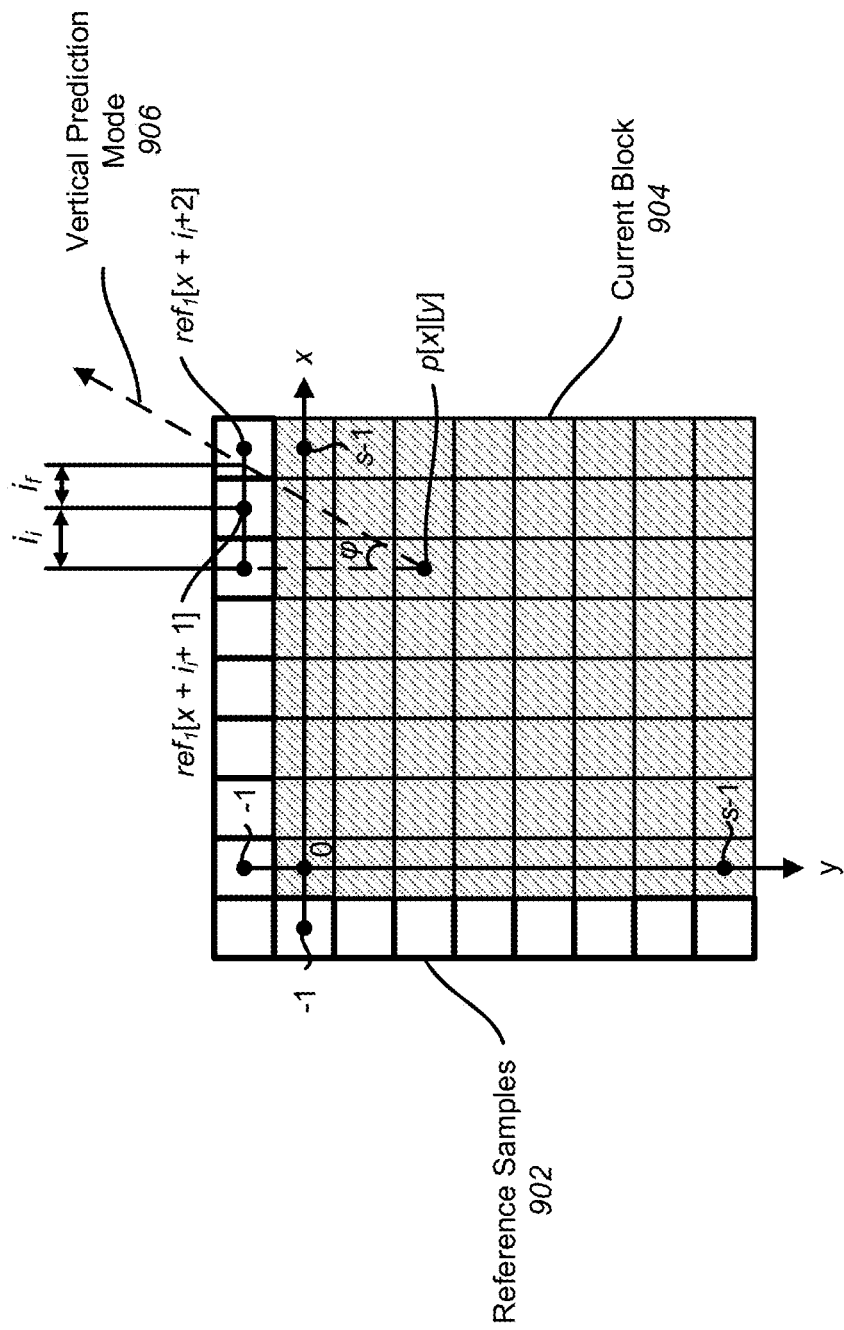
FIG. 12 shows an example application of an intra prediction mode for prediction of a current block.

FIG. 12 shows an example application of an intra prediction mode for prediction of a current block. FIG. 12 specifically shows prediction of a sample at a location [x][y] in the current block 904 for a vertical prediction mode 906. The vertical prediction mode 906 may be given by an angle φ with respect to the vertical axis. The location [x][y] in the current block 904, in vertical prediction modes, may be projected to a point (e.g., a projection point) on the horizontal line of reference samples $ref_1[x]$. The reference samples 902 are only partially shown in FIG. 12 for ease of illustration. As shown in FIG. 12, the projection point on the horizontal line of reference samples $ref_1[x]$ may not be exactly on a reference sample. A predicted sample p[x][y] in the current block 904 may be determined/calculated by linearly interpolating between the two reference samples, for example, if the projection point falls at a fractional sample position between two reference samples. The predicted sample p[x][y] may be determined/calculated as:

$$p[x][y]=(1-i_f)\cdot ref_1[x+i_i+1]+i_f\cdot ref_1[x+i_i+2]. \quad (7)$$

$i_i$ may be the integer part of the horizontal displacement of the projection point relative to the location [x][y]. $i_i$ may be determined/calculated as a function of the tangent of the angle φ of the vertical prediction mode 906 as:

$$i_i = \lfloor (y+1)\cdot \tan \varphi \rfloor. \quad (8)$$

$i_f$ may be the fractional part of the horizontal displacement of the projection point relative to the location [x][y] and may be determined/calculated as:

$$i_f = ((y+1)\cdot \tan \varphi) - \lfloor (y+1)\cdot \tan \varphi \rfloor, \quad (9)$$

where $\lfloor \cdot \rfloor$ is the integer floor function.

A location [x][y] of a sample in the current block 904 may be projected onto the vertical line of reference samples $ref_2[y]$, such as for horizontal prediction modes. A predicted sample p[x][y] for horizontal prediction modes may be determined/calculated as:

$$p[x][y]=(1-i_f)\cdot ref_2[y+i_i+1]+i_f\cdot ref_2[y+i_i+2]. \quad (10)$$

$i_i$ may be the integer part of the vertical displacement of the projection point relative to the location [x][y]. $i_i$ may be determined/calculated as a function of the tangent of the angle φ of the horizontal prediction mode as:

$$i_i = \lfloor (x+1)\cdot \tan \varphi \rfloor. \quad (11)$$

$i_i$ may be the fractional part of the vertical displacement of the projection point relative to the location [x][y]. $i_i$ may be determined/calculated as:

$$i_f = ((x+1)\cdot \tan \varphi) - \lfloor (x+1)\cdot \tan \varphi \rfloor, \quad (12)$$

where $\lfloor \cdot \rfloor$ is the integer floor function.

The interpolation functions given by Equations (7) and (10) may be implemented by an encoder and/or a decoder (e.g., the encoder 200 in FIG. 2 and/or the decoder 300 in FIG. 3). The interpolation functions may be implemented by finite impulse response (FIR) filters. For example, the interpolation functions may be implemented as a set of two-tap FIR filters. The coefficients of the two-tap FIR filters may be respectively given by (1−$i_f$) and $i_f$. The predicted sample p[x][y], in angular intra prediction, may be calculated with some predefined level of sample accuracy (e.g., 1/32 sample accuracy, or accuracy defined by any other metric). For 1/32 sample accuracy, the set of two-tap FIR interpolation filters may comprise up to 32 different two-tap FIR interpolation filters—one for each of the 32 possible values of the fractional part of the projected displacement $i_f$. In other examples, different levels of sample accuracy may be used.

The FIR filters may be used for predicting chroma samples and/or luma samples. For example, the two-tap interpolation FIR filter may be used for predicting chroma samples and a same and/or a different interpolation technique/filter may be used for luma samples. For example, a four-tap FIR filter may be used to determine a predicted value of a luma sample. Coefficients of the four tap FIR filter may be determined based on $i_f$ (e.g., similar to the two-tap FIR filter). For 1/32 sample accuracy, a set of 32 different four-tap FIR filters may comprise up to 32 different four-tap FIR filters—one for each of the 32 possible values of the fractional part of the projected displacement $i_f$. In other examples, different levels of sample accuracy may be used. The set of four-tap FIR filters may be stored in a look-up table (LUT) and referenced based on $i_f$. A predicted sample p[x][y], for vertical prediction modes, may be determined based on the four-tap FIR filter as:

$$p[x][y] = \sum_{i=0}^{3} fT[i]\cdot ref_1[x + iIdx + i], \quad (13)$$

where fT[i], i=0 . . . 3, may be the filter coefficients, and Idx is integer displacement. A predicted sample p[x][y], for horizontal prediction modes, may be determined based on the four-tap FIR filter as:

$$p[x][y] = \sum_{i=0}^{3} fT[i]\cdot ref_2[y + iIdx + i]. \quad (14)$$

Supplementary reference samples may be determined/constructed if the location [x][y] of a sample in the current block 904 to be predicted is projected to a negative x coordinate. The location [x][y] of a sample may be projected to a negative x coordinate, for example, if negative vertical prediction angles φ are used. The supplementary reference samples may be determined/constructed by projecting the reference samples in 〚ref〛_2 [y] in the vertical line of reference samples 902 to the horizontal line of reference samples 902 using the negative vertical prediction angle φ. Supplementary reference samples may be similarly determined/constructed, for example, if the location [x][y] of a sample in the current block 904 to be predicted is projected to a negative y coordinate. The location [x][y] of a sample may be projected to a negative y coordinate, for example, if negative horizontal prediction angles φ are used. The supplementary reference samples may be determined/constructed by projecting the reference samples in 〚ref〛_1 [x] on the horizontal line of reference samples 902 to the vertical line of reference samples 902 using the negative horizontal prediction angle φ.

An encoder may determine/predict samples of a current block being encoded (e.g., the current block 904) for a plurality of intra prediction modes (e.g., using one or more of the functions described herein). For example, an encoder may determine/predict samples of a current block for each of 35 intra prediction modes in HEVC and/or 67 intra prediction modes in VVC. The encoder may determine, for each intra prediction mode applied, a corresponding prediction error for the current block based on a difference (e.g., sum of squared differences (SSD), sum of absolute differences (SAD), or sum of absolute transformed differences (SATD)) between the prediction samples determined for the intra prediction mode and the original samples of the current block. The encoder may determine/select one of the intra prediction modes to encode the current block based on the determined prediction errors. For example, the encoder may determine/select one of the intra prediction modes that results in the smallest prediction error for the current block. The encoder may determine/select the intra prediction mode to encode the current block based on a rate-distortion measure (e.g., Lagrangian rate-distortion cost) determined using the prediction errors. The encoder may send an indication of the determined/selected intra prediction mode and its corresponding prediction error (e.g., residual) to a decoder for decoding of the current block.

A decoder may determine/predict samples of a current block being decoded (e.g., the current block 904) for an intra prediction mode. For example, a decoder may receive an indication of an intra prediction mode (e.g., an angular intra prediction mode) from an encoder for a current block. The decoder may construct a set of reference samples and perform intra prediction based on the intra prediction mode indicated by the encoder for the current block in a similar manner (e.g., as described above for the encoder). The decoder may add predicted values of the samples (e.g., determined based on the intra prediction mode) of the current block to a residual of the current block to reconstruct the current block. A decoder need not receive an indication of an angular intra prediction mode from an encoder for a current block. A decoder may determine an intra prediction mode, for example, based on other criteria. While various examples herein correspond to intra prediction modes in HEVC and VVC, the methods, devices, and systems as described herein may be applied to/used for other intra prediction modes (e.g., as used in other video coding standards/formats, such as VP8, VP9, AV1, etc.).

Intra prediction may exploit correlations between spatially neighboring samples in the same picture of a video sequence to perform video compression. Inter prediction is another coding tool that may be used to perform video compression. Inter prediction may exploit correlations in the time domain between blocks of samples in different pictures of a video sequence. For example, an object may be seen across multiple pictures of a video sequence. The object may move (e.g., by some translation and/or affine motion) or remain stationary across the multiple pictures. A current block of samples in a current picture being encoded may have/be associated with a corresponding block of samples in a previously decoded picture. The corresponding block of samples may accurately predict the current block of samples. The corresponding block of samples may be displaced from the current block of samples, for example, due to movement of the object, represented in both blocks, across the respective pictures of the blocks. The previously decoded picture may be a reference picture. The corresponding block of samples in the reference picture may be a reference block for motion compensated prediction. An encoder may use a block matching technique to estimate the displacement (or motion) of the object and/or to determine the reference block in the reference picture.

An encoder may determine a difference between a current block and a prediction for a current block. An encoder may determine a difference, for example, based on/after determining/generating a prediction for a current block (e.g., using inter prediction). The difference may be a prediction error and/or as a residual. The encoder may store and/or send (e.g., signal), in/via a bitstream, the prediction error and/or other related prediction information. The prediction error and/or other related prediction information may be used for decoding and/or other forms of consumption. A decoder may decode the current block by predicting the samples of the current block (e.g., by using the related prediction information) and combining the predicted samples with the prediction error.

Figure 13A:
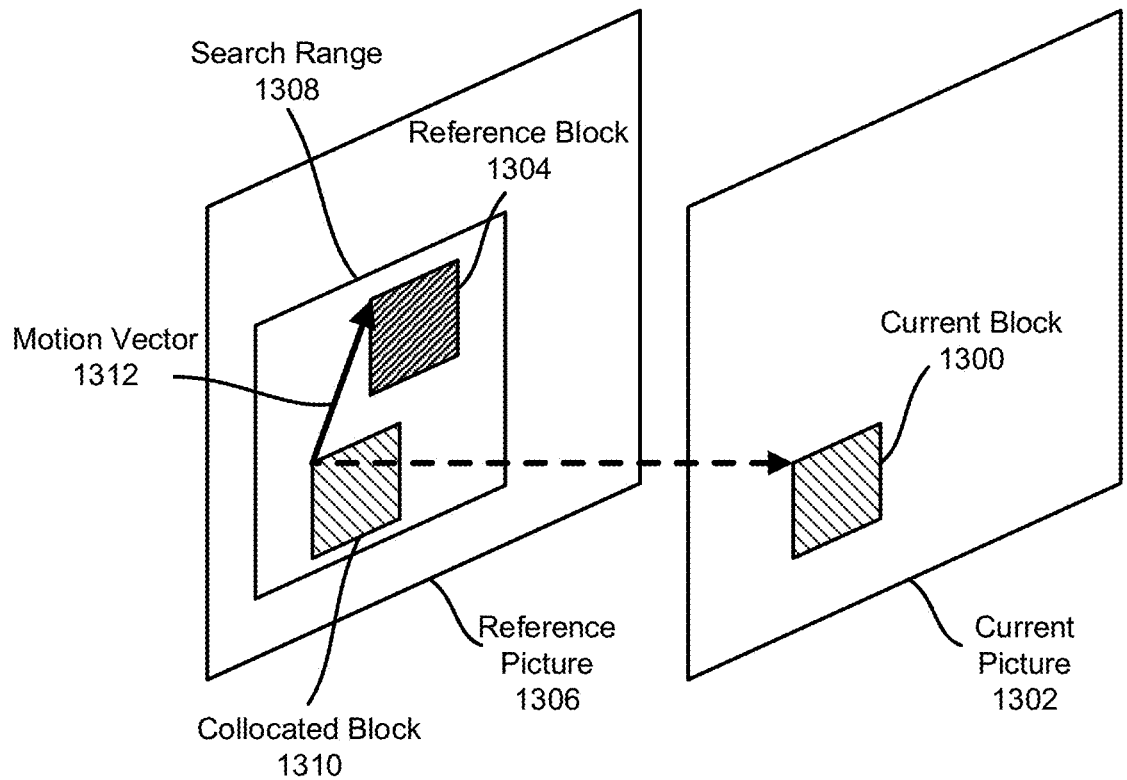
FIG. 13A shows an example of inter prediction.

FIG. 13A shows an example of inter prediction. The inter prediction may be performed for a current block 1300 in a current picture 1302 being encoded. An encoder (e.g., the encoder 200 as shown in FIG. 2) may perform inter prediction to determine and/or generate a reference block 1304 in a reference picture 1306. The reference block 1304 may be used to predict the current block 1300. Reference pictures (e.g., the reference picture 1306) may be prior decoded pictures available at the encoder and/or a decoder. Availability of a prior decoded picture may depend/be based on whether the prior decoded picture is available in a decoded picture buffer, at the time, the current block 1300 is being encoded and/or decoded. The encoder may search the one or more reference pictures 1306 for a block that is similar (or substantially similar) to the current block 1300. The encoder may determine the best matching block from the blocks tested during the searching process. The best matching block may be a reference block 1304. The encoder may determine that the reference block 1304 is the best matching reference block based on one or more cost criteria. The one or more cost criteria may comprise a rate-distortion criterion (e.g., Lagrangian rate-distortion cost). The one or more cost criteria may be based on a difference (e.g., SSD, SAD, and/or SATD) between prediction samples of the reference block 1304 and original samples of the current block 1300.

The encoder may search for the reference block 1304 within a reference region (e.g., a search range 1308). The reference region (e.g., a search range 1308) may be positioned around a collocated position (or block) 1310, of the current block 1300, in the reference picture 1306. The collocated block 1310 may have a same position in the reference picture 1306 as the current block 1300 in the current picture 1302. The reference region (e.g., a search range 1308) may at least partially extend outside of the reference picture 1306. Constant boundary extension may be used, for example, if the reference region (e.g., a search range 1308) extends outside of the reference picture 1306. The constant boundary extension may be used such that values of the samples in a row or a column of reference picture 1306, immediately adjacent to a portion of the reference region (e.g., a search range 1308) extending outside of the reference picture 1306, may be used for sample locations outside of the reference picture 1306. A subset of potential positions, or all potential positions, within the reference region (e.g., a search range 1308) may be searched for the reference block 1304. The encoder may utilize one or more search implementations to determine and/or generate the reference block 1304. For example, the encoder may determine a set of candidate search positions based on motion information of neighboring blocks (e.g., a motion vector 1312) to the current block 1300.

One or more reference pictures may be searched by the encoder during inter prediction to determine and/or generate the best matching reference block. The reference pictures searched by the encoder may be included in (e.g., added to) one or more reference picture lists. For example, in HEVC and VVC (and/or in one or more other communication protocols), two reference picture lists may be used (e.g., a reference picture list 0 and a reference picture list 1). A reference picture list may include one or more pictures. The reference picture 1306 of the reference block 1304 may be indicated by a reference index pointing into a reference picture list comprising the reference picture 1306.

Figure 13B:
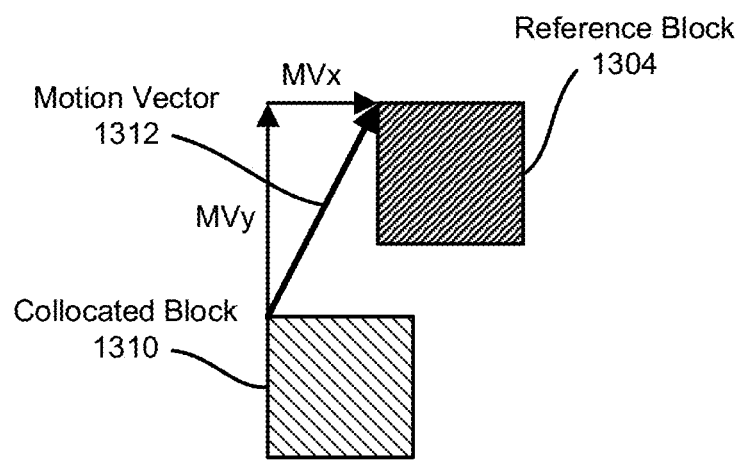
FIG. 13B shows an example motion vector.

FIG. 13B shows an example motion vector. A displacement between the reference block 1304 and the current block 1300 may be interpreted as an estimate of the motion between the reference block 1304 and the current block 1300 across their respective pictures. The displacement may be represented by a motion vector 1312. For example, the motion vector 1312 may be indicated by a horizontal component (MVx) and a vertical component (MVy) relative to the position of the current block 1300. A motion vector (e.g., the motion vector 1312) may have fractional or integer resolution. A motion vector with fractional resolution may point between two samples in a reference picture to provide a better estimation of the motion of the current block 1300. For example, a motion vector may have $\frac{1}{2}$, $\frac{1}{4}$, $\frac{1}{8}$, $\frac{1}{16}$, $\frac{1}{32}$, or any other fractional sample resolution. Interpolation between the two samples at integer positions may be used to generate a reference block and its corresponding samples at fractional positions, for example, if a motion vector points to a non-integer sample value in the reference picture. The interpolation may be performed by a filter with two or more taps.

The encoder may determine a difference (e.g., a corresponding sample-by-sample difference) between the reference block 1304 and the current block 1300. The encoder may determine the difference between the reference block 1304 and the current block 1300, for example, based on/after the reference block 1304 is determined and/or generated, using inter prediction, for the current block 1300. The difference may be a prediction error and/or a residual. The encoder may store and/or send (e.g., signal), in/via a bitstream, the prediction error and/or related motion information. The prediction error and/or the related motion information may be used for decoding (e.g., decoding the current block 1300) and/or other forms of consumption. The motion information may comprise the motion vector 1312 and/or a reference indicator/index. The reference indicator may indicate the reference picture 1306 in a reference picture list. The motion information may comprise an indication of the motion vector 1312 and/or an indication of the reference index. The reference index may indicate reference picture 1306 in the reference picture list. A decoder may decode the current block 1300 by determining and/or generating the reference block 1304. The decoder may determine and/or generate the reference block 1304, for example, based on the prediction error and/or the related motion information. The reference block 1304 may correspond to/form (e.g., be considered as) a prediction of the current block 1300. The decoder may decode the current block 1300 based on combining the prediction with the prediction error.

Inter prediction, as shown in FIG. 13A, may be performed using one reference picture 1306 as a source of a prediction for the current block 1300. Inter prediction based on a prediction of a current block using a single picture may be referred to as uni-prediction. Inter prediction of a current block, using bi-prediction, may be based on two pictures.

Bi-prediction may be useful, for example, if a video sequence comprises fast motion, camera panning, zooming, and/or scene changes. Bi-prediction may be useful to capture fade outs of one scene or fade outs from one scene to another, where two pictures may effectively be displayed simultaneously with different levels of intensity.

One or both of uni-prediction and bi-prediction may be available/used for performing inter prediction (e.g., at an encoder and/or at a decoder). Performing a specific type of inter prediction (e.g., uni-prediction and/or bi-prediction) may depend on a slice type of current block. For example, for P slices, only uni-prediction may be available/used for performing inter prediction. For B slices, either uni-prediction or bi-prediction may be available/used for performing inter prediction. An encoder may determine and/or generate a reference block, for predicting a current block, from a reference picture list 0, for example, if the encoder is using uni-prediction. An encoder may determine and/or generate a first reference block, for predicting a current block, from a reference picture list 0 and determine and/or generate a second reference block, for predicting the current block, from a reference picture list 1, for example, if the encoder is using bi-prediction.

Figure 14:
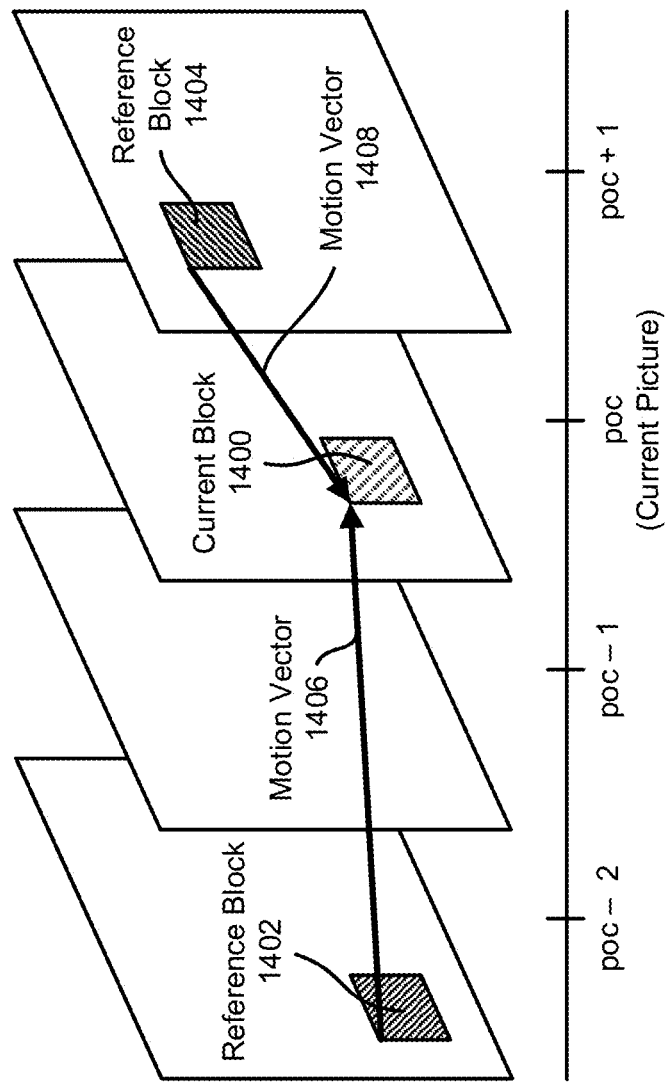
FIG. 14 shows an example of bi-prediction.

FIG. 14 shows an example of bi-prediction. Two reference blocks 1402 and 1404 may be used to predict a current block 1400. The reference block 1402 may be in a reference picture of one of reference picture list 0 or reference picture list 1. The reference block 1404 may be in a reference picture of another one of reference picture list 0 or reference picture list 1. As shown in FIG. 14, the reference block 1402 may be in a first picture that precedes (e.g., in time) a current picture of the current block 1400, and the reference block 1404 may be in a second picture that succeeds (e.g., in time) the current picture of the current block 1400. The first picture may precede the current picture in terms of a picture order count (POC). The second picture may succeed the current picture in terms of the POC. The reference pictures may both precede or both succeed the current picture in terms of POC. A POC may be/indicate an order in which pictures are output (e.g., from a decoded picture buffer). A POC may be/indicate an order in which pictures are generally intended to be displayed. Pictures that are output may not necessarily be displayed but may undergo different processing and/or consumption (e.g., transcoding). The two reference blocks determined and/or generated using/for bi-prediction may correspond to (e.g., be comprised in) a same reference picture. The reference picture may be included in both the reference picture list 0 and the reference picture list 1, for example, if the two reference blocks correspond to the same reference picture.

A configurable weight and/or offset value may be applied to one or more inter prediction reference blocks. An encoder may enable the use of weighted prediction using a flag in a picture parameter set (PPS). The encoder may send/signal the weight and/or offset parameters in a slice segment header for the current block 1400. Different weight and/or offset parameters may be sent/signaled for luma and/or chroma components.

The encoder may determine and/or generate the reference blocks 1402 and 1404 for the current block 1400 using inter prediction. The encoder may determine a difference between the current block 1400 and each of the reference blocks 1402 and 1404. The differences may be prediction errors or residuals. The encoder may store and/or send/signal, in/via a bitstream, the prediction errors and/or their respective related motion information. The prediction errors and their respective related motion information may be used for decoding and/or other forms of consumption. The motion information for the reference block 1402 may comprise a motion vector 1406 and/or a reference indicator/index. The reference indicator may indicate a reference picture, of the reference block 1402, in a reference picture list. The motion information for the reference block 1402 may comprise an indication of the motion vector 1406 and/or an indication of the reference index. The reference index may indicate the reference picture, of the reference block 1402, in the reference picture list.

The motion information for the reference block 1404 may comprise a motion vector 1408 and/or a reference index/indicator. The reference indicator may indicate a reference picture, of the reference block 1408, in a reference picture list. The motion information for the reference block 1404 may comprise an indication of motion vector 1408 and/or an indication of the reference index. The reference index may indicate the reference picture, of the reference block 1404, in the reference picture list.

A decoder may decode the current block 1400 by determining and/or generating the reference blocks 1402 and 1404. The decoder may determine and/or generate the reference blocks 1402 and 1404, for example, based on the prediction errors and/or the respective related motion information for the reference blocks 1402 and 1404. The reference blocks 1402 and 1404 may correspond to/form (e.g., be considered as) the predictions of the current block 1400. The decoder may decode the current block 1400 based on combining the predictions with the prediction errors.

Motion information may be predictively coded, for example, before being stored and/or sent/signaled in/via a bit stream (e.g., in HEVC, VVC, and/or other video coding standards/formats/protocols). The motion information for a current block may be predictively coded based on motion information of one or more blocks neighboring the current block. The motion information of the neighboring block(s) may often correlate with the motion information of the current block because the motion of an object represented in the current block is often the same as (or similar to) the motion of objects in the neighboring block(s). Motion information prediction techniques may comprise advanced motion vector prediction (AMVP) and/or inter prediction block merging.

An encoder (e.g., the encoder 200 as shown in FIG. 2), may code a motion vector. The encoder may code the motion vector (e.g., using AMVP) as a difference between a motion vector of a current block being coded and a motion vector predictor (MVP). An encoder may determine/select the MVP from a list of candidate MVPs. The candidate MVPs may be/correspond to previously decoded motion vectors of neighboring blocks in the current picture of the current block, and/or blocks at or near the collocated position of the current block in other reference pictures. The encoder and/or a decoder may generate and/or determine the list of candidate MVPs.

The encoder may determine/select an MVP from the list of candidate MVPs. The encoder may send/signal, in/via a bitstream, an indication of the selected MVP and/or a motion vector difference (MVD). The encoder may indicate the selected MVP in the bitstream using an index/indicator. The index may indicate the selected MVP in the list of candidate MVPs. The MVD may be determined/calculated based on a difference between the motion vector of the current block and the selected MVP. For example, for a motion vector that indicates a position (e.g., represented by a horizontal component (MVx) and a vertical component (MVy)) relative to a position of the current block being coded, the MVD may be represented by two components MVD_x and MVD_y. MVD_x and MVD_y may be determined/calculated as:

$$MVD_x = MV_x - MVP_x, \quad (15)$$

$$MVD_y = MV_y - MVP_y. \quad (16)$$

MVDx and MVDy may respectively represent horizontal and vertical components of the MVD. MVPx and MVPy may respectively represent horizontal and vertical components of the MVP. A decoder (e.g., the decoder 300 as shown in FIG. 3) may decode the motion vector by adding the MVD to the MVP indicated in/via the bitstream. The decoder may decode the current block by determining and/or generating the reference block. The decoder may determine and/or generate the reference block, for example, based on the decoded motion vector. The reference block may correspond to/form (e.g., be considered as) the prediction of the current block. The decoder may decode the current block by combining the prediction with the prediction error.

The list of candidate MVPs (e.g., in HEVC, VVC, and/or one or more other communication protocols), for AMVP, may comprise two or more candidates (e.g., candidates A and B). Candidates A and B may comprise: up to two (or any other quantity of) spatial candidate MVPs determined/derived from five (or any other quantity of) spatial neighboring blocks of a current block being coded; one (or any other quantity of) temporal candidate MVP determined/derived from two (or any other quantity of) temporal, co-located blocks (e.g., if both of the two spatial candidate MVPs are not available or are identical); and/or zero motion vector candidate MVPs (e.g., if one or both of the spatial candidate MVPs or temporal candidate MVPs are not available). Other quantities of spatial candidate MVPs, spatial neighboring blocks, temporal candidate MVPs, and/or temporal, co-located blocks may be used for the list of candidate MVPs.

Figure 15A:
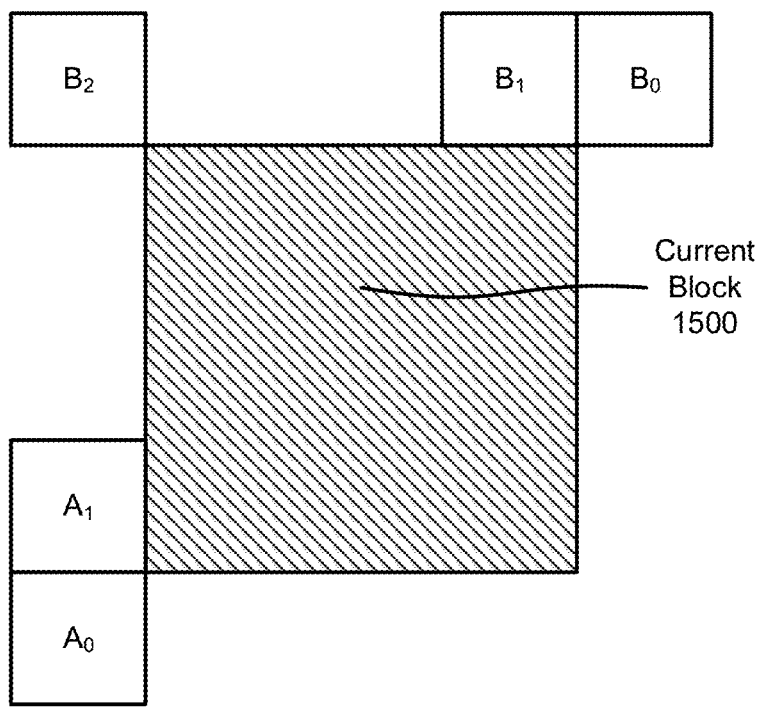
FIG. 15A shows example spatial candidate neighboring blocks for a current block.
Figure 15B:
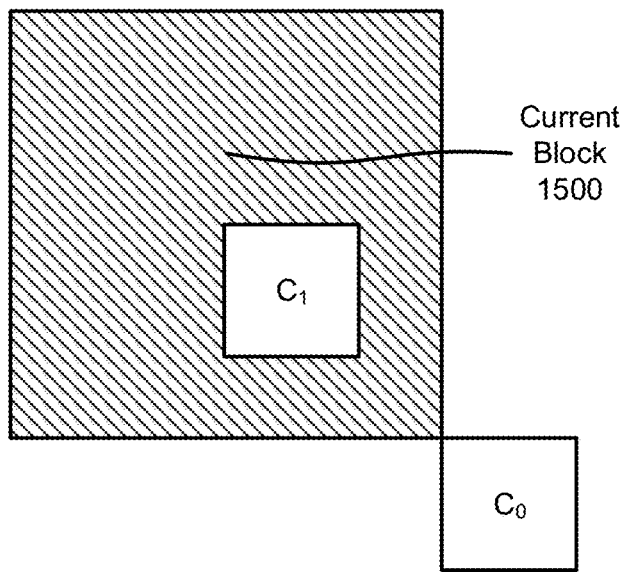
FIG. 15B shows example temporal, co-located blocks for a current block.

FIG. 15A shows spatial candidate neighboring blocks for a current block. For example, five (or any other quantity of) spatial candidate neighboring blocks may be located relative to a current block 1500 being encoded. The five spatial candidate neighboring blocks may be A0, A1, B0, B1, and B2. FIG. 15B shows temporal, co-located blocks for the current block. For example, two (or any other quantity of) temporal, co-located blocks may be located relative to the current block 1500. The two temporal, co-located blocks may be C0 and C1. The two temporal, co-located blocks may be in one or more reference pictures that may be different from the current picture of the current block 1500.

An encoder (e.g., the encoder 200 as shown in FIG. 2) may code a motion vector using inter prediction block merging (e.g., a merge mode). The encoder (e.g., using merge mode) may reuse the same motion information of a neighboring block (e.g., one of neighboring blocks A0, A1, B0, B1, and B2) for inter prediction of a current block. The encoder (e.g., using merge mode) may reuse the same motion information of a temporal, co-located block (e.g., one of temporal, co-located blocks C0 and C1) for inter prediction of a current block. An MVD need not be sent (e.g., indicated, signaled) for the current block because the same motion information as that of a neighboring block or a temporal, co-located block may be used for the current block (e.g., at the encoder and/or a decoder). A signaling overhead for sending/signaling the motion information of the current block may be reduced because the MVD need not be indicated for the current block. The encoder and/or the decoder may generate a candidate list of motion information from neighboring blocks or temporal, co-located blocks of the current block (e.g., in a manner similar to AMVP). The encoder may determine to use (e.g., inherit) motion information, of one neighboring block or one temporal, co-located block in the candidate list, for predicting motion information of the current block being coded. The encoder may signal/send, in/via a bit stream, an indication of the determined motion information from the candidate list. For example, the encoder may signal/send an indicator/index. The index may indicate the determined motion information in the list of candidate motion information. The encoder may signal/send the index to indicate the determined motion information.

A list of candidate motion information for merge mode (e.g., in HEVC, VVC, or any other coding formats/standards/protocols) may comprise: up to four (or any other quantity of) spatial merge candidates derived/determined from five (or any other quantity of) spatial neighboring blocks (e.g., as shown in FIG. 15A); one (or any other quantity of) temporal merge candidate derived from two (or any other quantity of) temporal, co-located blocks (e.g., as shown in FIG. 15B); and/or additional merge candidates comprising bi-predictive candidates and zero motion vector candidates. The spatial neighboring blocks and the temporal, co-located blocks used for merge mode may be the same as the spatial neighboring blocks and the temporal, co-located blocks used for AMVP.

Inter prediction may be performed in other ways and variants than those described herein. For example, motion information prediction techniques other than AMVP and merge mode may be used. While various examples herein correspond to inter prediction modes, such as used in HEVC and VVC, the methods, devices, and systems as described herein may be applied to/used for other inter prediction modes (e.g., as used for other video coding standards/formats such as VP8, VP9, AV1, etc.). History based motion vector prediction (HMVP), combined intra/inter prediction mode (CIIP), and/or merge mode with motion vector difference (MMVD) (e.g., as described in VVC) may be performed/used and are within the scope of the present disclosure.

Block matching may be used (e.g., in inter prediction) to determine a reference block in a different picture than that of a current block being encoded. Block matching may be used to determine a reference block in a same picture as that of a current block being encoded. The reference block, in a same picture as that of the current block, as determined using block matching may often not accurately predict the current block (e.g., for camera captured videos). Prediction accuracy for screen content videos may not be similarly impacted, for example, if a reference block in the same picture as that of the current block is used for encoding. Screen content videos may comprise, for example, computer generated text, graphics, animation, etc. Screen content videos may comprise (e.g., may often comprise) repeated patterns (e.g., repeated patterns of text and/or graphics) within the same picture. Using a reference block (e.g., as determined using block matching), in a same picture as that of a current block being encoded, may provide efficient compression for screen content videos.

A prediction technique may be used (e.g., in HEVC, VVC, and/or any other coding standards/formats/protocols) to exploit correlation between blocks of samples within a same picture (e.g., of screen content videos). The prediction technique may be intra block copy (IBC) or current picture referencing (CPR). An encoder may apply/use a block matching technique (e.g., similar to inter prediction) to determine a displacement vector (e.g., a block vector (BV)). The BV may indicate a relative position of a reference block (e.g., in accordance with intra block compensated prediction), that best matches the current block, from a position of the current block. For example, the relative position of the reference block may be a relative position of a top-left corner (or any other point/sample) of the reference block. The BV may indicate a relative displacement from the current block to the reference block that best matches the current block. The encoder may determine the best matching reference block from blocks tested during a searching process (e.g., in a manner similar to that used for inter prediction). The encoder may determine that a reference block is the best matching reference block based on one or more cost criteria. The one or more cost criteria may comprise a rate-distortion criterion (e.g., Lagrangian rate-distortion cost). The one or more cost criteria may be based on, for example, one or more differences (e.g., an SSD, an SAD, an SATD, and/or a difference determined based on a hash function) between the prediction samples of the reference block and the original samples of the current block. A reference block may correspond to/comprise prior decoded blocks of samples of the current picture. The reference block may comprise decoded blocks of samples of the current picture prior to being processed by in-loop filtering operations (e.g., deblocking and/or SAO filtering).

Figure 16:
FIG. 16 shows an example of intra block copy (IBC) for encoding.

FIG. 16 shows an example of IBC for encoding. The example IBC shown in FIG. 16 may correspond to screen content. The rectangular portions/sections with arrows beginning at their boundaries may be the current blocks being encoded. The rectangular portions/sections that the arrows point to may be the reference blocks for predicting the current blocks.

A reference block may be determined and/or generated, for a current block, for IBC. The encoder may determine a difference (e.g., a corresponding sample-by-sample difference) between the reference block and the current block. The difference may be a prediction error or residual. The encoder may store and/or send/signal, in/via a bitstream the prediction error and/or related prediction information. The prediction error and/or the related prediction information may be used for decoding and/or other forms of consumption. The prediction information may comprise a BV. The prediction information may comprise an indication of the BV. A decoder (e.g., the decoder 300 as shown in FIG. 3), may decode the current block by determining and/or generating the reference block. The decoder may determine and/or generate the current block, for example, based on the prediction information (e.g., the BV). The reference block may correspond to/form (e.g., be considered as) the prediction of the current block. The decoder may decode the current block by combining the prediction with the prediction error.

A BV may be predictively coded (e.g., in HEVC, VVC, and/or any other coding standards/formats/protocols) before being stored and/or sent/signaled in/via a bit stream. The BV for a current block may be predictively coded based on a BV of one or more blocks neighboring the current block. For example, an encoder may predictively code a BV using the merge mode (e.g., in a manner similar to as described herein for inter prediction), AMVP (e.g., as described herein for inter prediction), or a technique similar to AMVP. The technique similar to AMVP may be BV prediction and difference coding (or AMVP for IBC).

An encoder (e.g., the encoder 200 as shown in FIG. 2) performing BV prediction and coding may code a BV as a difference between the BV of a current block being coded and a block vector predictor (BVP). An encoder may select/determine the BVP from a list of candidate BVPs. The candidate BVPs may comprise/correspond to previously decoded BVs of neighboring blocks in the current picture of the current block. The encoder and/or a decoder may generate or determine the list of candidate BVPs.

After the encoder selects a BVP from the list of candidate BVPs, the encoder may signal, in a bitstream, an indication of the selected BVP and a BV difference (BVD). The encoder may indicate the selected BVP in the bitstream by an index pointing into the list of candidate BVPs. The BVD may be calculated based on the difference between the BV of the current block and the selected BVP. For example, for a BV represented by a horizontal component ($BV_x$) and a vertical component ($BV_y$) relative to the position of the current block being coded, the BVD may represented by two components calculated as follows:

$$BVD_x = BV_x - BVP_x \qquad (17)$$

$$BVD_y = BV_y - BVP_y \qquad (18)$$

where BVDx and BVDy respectively represent the horizontal and vertical components of the BVD, and BVPx and BVPy respectively represent the horizontal and vertical components of the BVP. A decoder, such as decoder 300 in FIG. 3, may decode the BV by adding the BVD to the BVP indicated in the bitstream. The decoder may then decode the current block by determining and/or generating the reference block, which forms the prediction of the current block, using the decoded BV and combining the prediction with the prediction error.

In HEVC and VVC, the list of candidate BVPs may comprise two candidates referred to as candidates A and B. Candidates A and B may include up to two spatial candidate BVPs derived from five spatial neighboring blocks of the current block being encoded, or one or more of the last two coded BVs when spatial neighboring candidates are not available (e.g., because they are coded in intra or inter mode). The location of the five spatial candidate neighboring blocks relative to a current block being encoded using IBC are the same as those shown in FIG. 15A for inter prediction. The five spatial candidate neighboring blocks are respectively denoted $A_0$, $A_1$, $B_0$, $B_1$, and $B_2$.

Bidirectional Prediction with Coding Unit Weights (BCW), also known as generalized bi-prediction (GBi), may be a weighted bi-prediction technique for predicting a block by weighted-averaging of two motion-compensated blocks. BCW extends the notion of weighted bi-prediction to a CU level, allowing bi-prediction weights to be determined per CU. The determined bi-prediction weights are used with respect to bi-prediction PUs, across all color components, to bi-predict the CU.

In some instances of BCW, a list of pre-defined candidate weights may be used. At the encoder, one of the pre-defined candidate weights may be selected as a BCW weight for a bi-predicted CU. A BCW index associated with a selected BCW weight may be signaled to a decoder, for example, for a non-merge coded CU (e.g., a CU for which merge mode may not be used to code the motion vector). The BCW index may point to an entry of the selected BCW weight in the list of pre-defined candidate weights. The BCW index may be inherited from neighboring blocks based on a signaled merge candidate index, for example, for a merge coded CU. The merge candidate index may point to a merge candidate of the merge coded CU.

A list of pre-defined candidate weights may include {-2/8, 3/8, 4/8, 5/8, and 10/8}, for non-low delay pictures, for example, where a reference picture list 0 corresponds to pictures that precede a current picture and a reference picture list 1 corresponds to pictures that may follow the current picture in terms of a picture order count (POC). A list may be reduced to {3/8, 4/8, and 5/8}, for example, for low delay pictures (e.g., where both a reference picture list 0 and a reference picture list 1 correspond to pictures that may precede the current picture).

A unit-gain constraint may be used. The unit-gain constraint may be enforced by using a selected and/or determined BCW weight, W, to a reference block obtained from reference picture list 1 and/or by using a reciprocal weight (1−W) to a reference block obtained from reference picture list 0. Each luma and/or chroma BCW prediction sample may be computed, for example, as follows:

$$P_{BCW}=(8(1-W)*P0+8W*P1+4)>>3 \quad (18)$$

where $P_{BCW}$ represents a luma and/or chroma BCW prediction sample of a current block, P0 and P1 represent prediction samples (indicated by the motion vectors) respectively from reference picture list 0 and reference picture list 1, and where >> designates a right shift.

As described herein, in some instances of BCW, BCW weights may be selected from a list of pre-defined candidate weights. A list of pre-defined candidate weights may be limited to 5 weights for non-low delay pictures and/or to 3 weights for low delay pictures. The BCW weight, for merge coded CUs, may be derived based on the list of pre-defined candidate weights using a template matching (TM) cost. Given an inherited BCW weight, some BCW techniques propose adjusting the BCW weight based on the list of pre-defined candidate weights. Specifically, these BCW technique compare the BCW weight with one or more neighboring weights in the list of pre-defined candidate weights, based on TM cost. These BCW techniques propose comparing the weight 3/8 with the weights 4/8 and 5/8 based on TM cost, for example, if the BCW weight corresponds to the value 4/8 from the list {3/8, 4/8, and 5/8}. The TM cost for a BCW weight may be calculated based on templates (e.g., neighboring reconstructed samples) of a current block and/or reference blocks obtained respectively from reference picture list 0 and reference picture list 1. The weight with the minimum TM cost may be selected as the BCW weight for the BCW prediction.

These BCW techniques calculate the TM cost based only on the luma component while the derived BCW weight is used with respect to collocated luma and chroma components of the CU. This BCW weight adjustment may be less accurate for chroma blocks, which may lead to a decrease in overall compression performance, particularly for non-monochrome video sequences.

Described herein is an enhanced TM cost function that may address the above discussed problem. The enhanced TM cost function described herein incorporates TM cost over more than one color component of a CU, resulting in improved TM cost accuracy. The enhanced TM cost function may be used in a weight-adjustment technique, such as BCW weight adjustment. As described herein, an enhanced TM cost function may be used to derive a BCW weight based on templates. A BCW weight may be derived independent of a list of pre-defined candidate weights. A BCW weight selected and/or derived, as described herein, may be used, for example, in bi-prediction, multi-hypothesis prediction, and/or combined intra/inter prediction (CIIP).

An enhanced TM cost function may incorporate more than one color component of a CU. The enhanced TM cost function may be used to estimate a TM cost as a weighted sum of multiple TM cost components. For a CU with luma (Y), blue-difference chroma (Cb), and red-difference chroma (Cr) components, the TM cost for the CU ($D_{TM}$) may be computed as a weighted sum of three (3) TM cost components according to Equation 19:

$$D_{TM}=w_{LUMA} \times D_{TM\_LUMA}+w_{Cb} \times D_{TM\_Cb}+w_{Cr} \times D_{TM\_Cr} \quad (19)$$

where $D_{TM\_LUMA}$, $D_{TM\_Cb}$ and, $D_{TM\_Cb}$ represent TM costs based on the luma component, the Cb component, and the Cr component, respectively, and where $w_{LUMA}$, $w_{Cb}$, and $w_{Cr}$ represent weighting coefficients for $D_{TM\_LUMA}$, $D_{TM\_Cb}$ and, $D_{TM\_Cb}$, respectively. The luma, Cb, and Cr components may be collocated.

An enhanced TM cost function may be used similarly for a CU with a different color model (e.g., red-green-blue (RGB) or red-yellow-blue (RYB)) or a different number of color components (e.g., cyan-magenta-yellow-key (CMYK)).

Figure 17A:
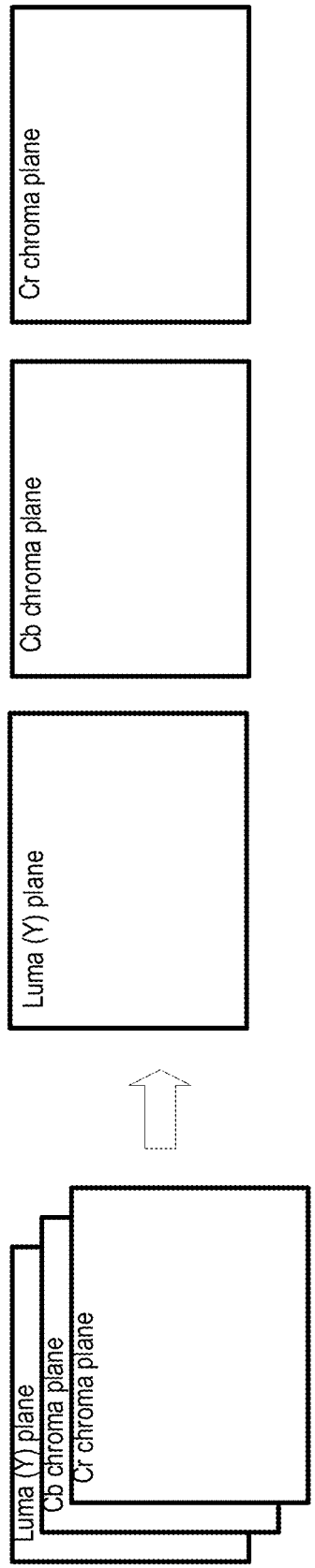
FIG. 17A and FIG. 17B show example chroma formats that may be used for a YCbCr color model.
Figure 17B:
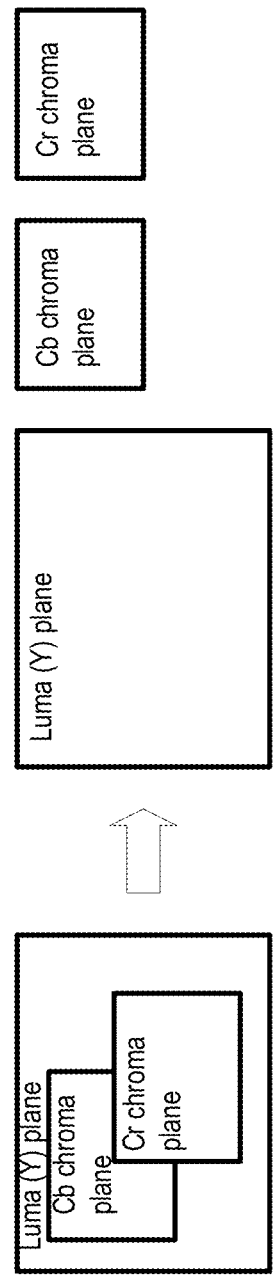

Weighting coefficients (e.g., $w_{LUMA}$, $w_{Cb}$, and $w_{Cr}$) may be fixed (e.g., equal weights) or selected based on one or more features of the CU (e.g., color model, chroma format, video content resolution, bit depth, etc.). Weighting coefficients may be selected, for example, based on a chroma format of a CU. A chroma format of a CU may, for example, depend on whether chroma subsampling is used in encoding the CU. FIGS. 17A and 17B show example chroma formats that may be used for a YCbCr color model. The chroma formats shown in FIGS. 17A and 17B are known, respectively, as 4:4:4 and 4:2:0. In the 4:4:4 chroma format, as shown in FIG. 17A, no chroma subsampling is used and the Y, Cb, and Cr color components have an equal sample rate. In the 4:2:0 chroma format, as shown in FIG. 17B, the chroma components (Cb and Cr) are sampled at half the sample rate of the luma component. Selecting a weighting coefficients based on the chroma format of the CU may include selecting a weighting coefficient for a TM cost based on a chroma component (e.g., $D_{TM\_Cb}$ or $D_{TM\_Cb}$) based on a ratio of a number of samples of the chroma block (e.g., Cb or Cr) to a number of samples of the luma block of the CU. Selecting weighing coefficients for a TM cost based on a chroma component may result in larger web and/or $w_{Cr}$ values for a 4:4:4 chroma format as compared to a 4:2:0 chroma format.

Weighting coefficients may be selected based on a content resolution of a video sequence comprising a CU. Selecting respective weighting coefficients based on the content resolution of the video sequence comprising the CU may comprise, for example, selecting a weighting coefficient for a TM cost based on a chroma component (e.g., $D_{TM\_Cb}$ and/or $D_{TM\_Cb}$) using a function that is inversely proportional to the content resolution of the video sequence comprising the CU. Selecting a weighting coefficient based on chroma component using a function that may be inversely proportional to the content resolution of the video sequence comprising the CU may result in lower web and/or $w_{Cr}$ values for a higher-resolution video content than for a lower-resolution video content.

Weighting coefficients may be selected based on respective bit depths of a color components of a CU. The weighting coefficients, as such, for example, may take on different values for Standard Dynamic Range (SDR), High Dynamic Range (HDR), Standard Color Gamut (SCG), and/or Wide Color Gamut (WCG) content.

To facilitate implementation, an enhanced TM cost function may be replaced with:

$$D_{TM}=(D_{TM\_LUMA}<<S_{LUMA})+D_{TM\_Cb}+D_{TM\_Cr} \quad (20)$$

where << designates a left shift and $S_{LUMA}$ denotes a left shift value for a luma-based TM cost, $D_{TM\_LUMA}$. The value of $S_{LUMA}$ may determine a power of 2 increase ($2^{\wedge}S_{LUMA}$) of a weighting coefficient for $D_{TM\_LUMA}$ compared to weighting coefficients for $D_{TM\_Cb}$ and/or $D_{TM\_Cb}$.

$S_{LUMA}$ may be, for example, the integer values 0, 1, 2, 3, 4, etc. Selecting the value of $S_{LUMA}$ may be equivalent to selecting weighting coefficients $w_{LUMA}$, $w_{Cb}$, and/or $w_{Cr}$ of equation (19) described herein. The value of $S_{LUMA}$, similarly, may be selected based on one or more features of a CU (e.g., color model, chroma format, video content resolution, bit depth, etc.) as described herein with reference to weighting coefficients $w_{LUMA}$, $w_{Cb}$, and/or $w_{Cr}$.

Figure 18:
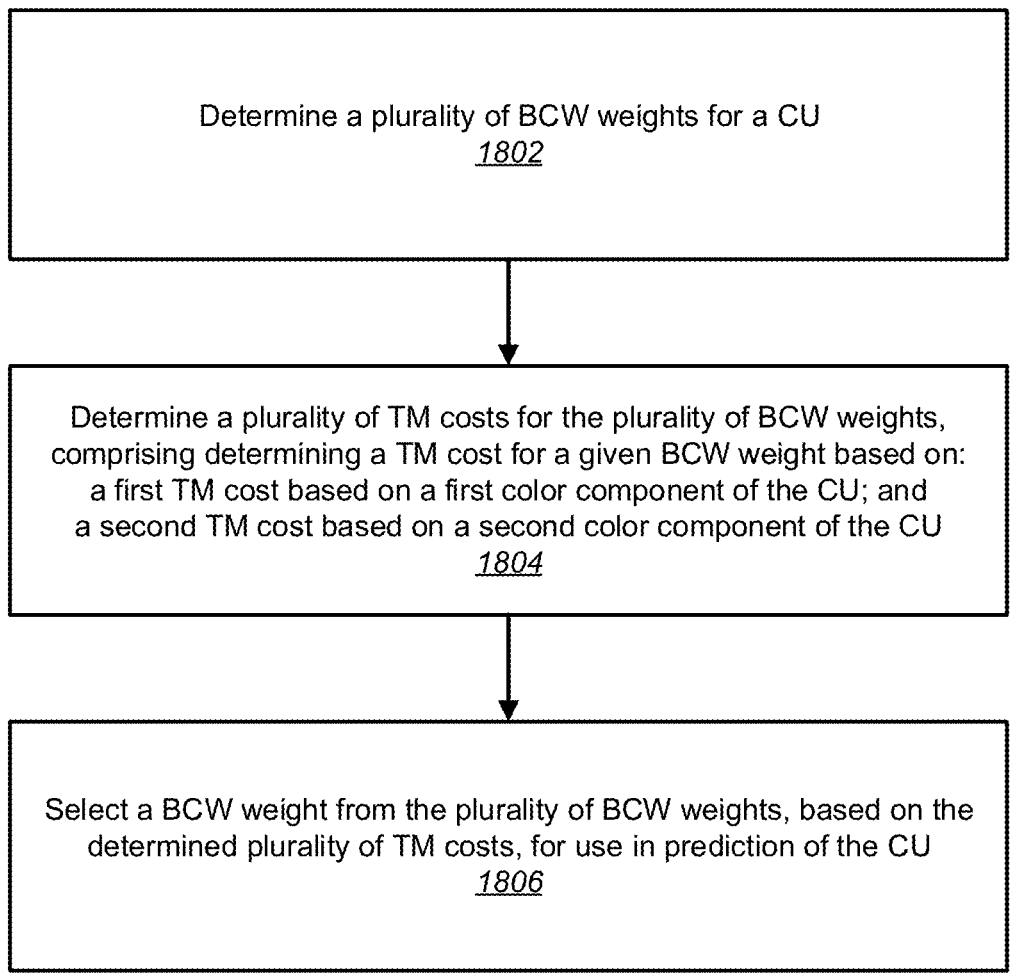
FIG. 18 shows an example method for determining bi-prediction with coding unit (CU) level weights (BCW) weight-adjustment.

An enhanced TM cost function, described herein, may be used in a weight-adjustment technique. FIG. 18 shows an example method for determining bi-prediction with coding unit (CU) level weights (BCW) weight-adjustment. More specifically, FIG. 18 shows a flowchart 1800 of an example method that may use an enhanced TM cost function to determine BCW weight-adjustment. The example method shown in FIG. 18, moreover, may be readily extended to weight-adjustment for other types of weighted prediction (e.g., multi-hypothesis prediction, CIIP, etc.)

One or more steps of the example method shown in flowchart 1800 may be performed by an encoder (e.g., as described herein with respect to FIG. 2) and by a decoder (e.g., as described herein with respect to FIG. 3). As shown in FIG. 18, step 1802 may include determining a plurality of BCW weights for a CU. A plurality of BCW weights may be determined, for example, based on a list of pre-defined candidate BCW weights. A list of pre-defined candidate BCW weights may comprise {-2/8, 3/8, 4/8, 5/8, and 10/8}, for example, if the CU is associated with a low delay picture. A list of pre-defined candidate BCW weights may comprise {3/8, 4/8, and 5/8}, for example, if the CU is associated with a non-low delay picture.

Determining a plurality of BCW weights based on a list of pre-defined candidate BCW weights may comprise obtaining an initial BCW weight and/or determining the plurality of BCW weights from the list of pre-defined candidate BCW weights. The plurality of BCW weights may be determined, for example, based on the initial BCW weight. The initial BCW weight may correspond to a derived, received, and/or inherited BCW weight. The initial BCW weight may correspond to a BCW weight that may be associated with a merge candidate of a CU, for example, for a merge coded CU. The initial BCW weight may be derived by the encoder (e.g., from a list of pre-defined candidate BCW weights) and received by the decoder in a video bitstream, for example, for a non-merge coded CU. A plurality of BCW weights that may be determined may comprise the initial BCW weight itself and/or one or more neighboring weights in a list of pre-defined candidate weights. The plurality of BCW weights may be determined, for example, based on the initial BCW weight. The plurality of BCW weights may comprise, for example: the initial BCW weight; a BCW weight that may be immediately lower than the initial BCW weight in the list of candidate BCW weights; and/or a BCW weight that may be immediately higher than the initial BCW weight in the list of candidate BCW weights. The one or more neighboring weights may comprise the values 4/8 and 5/8, for example, if the initial BCW weight corresponds to the value 4/8 from the list {3/8, 4/8, and 5/8}.

A plurality of BCW weights may be determined without use of a list of pre-defined candidate BCW weights. An initial BCW weight may be derived, for example, using a weight derivation method (e.g., the TM cost-based weight derivation method described herein), and a plurality of BCW weights may be determined, for example, based on the initial BCW weight (e.g., by adding/subtracting a refinement value to the initial BCW weight, one or more other BCW weights may be determined).

Step 1804, of FIG. 18, may include determining a plurality of TM costs for a plurality of BCW weights. A TM cost for a given BCW weight of a plurality of BCW weights may be determined based on: a first TM cost based on a first color component of a CU and a second TM cost based on a second color component of the CU. A TM cost may be determined, for example, based on a luma-based TM cost and at least one chroma-based TM cost, for example, if the CU is of the YCrCb type. A TM cost may be determined using the enhanced TM cost function as described herein in equations (18) and (19).

A first and/or second TM cost based on the first and/or second color component of the CU, for a given BCW weight, may be based on a sum of absolute differences (SAD). The sum of absolute differences (SAD) may be based on: a template of the first and/or second color component of the CU; and a weighted sum, based on the given BCW weight, of templates (e.g., for a first and/or second color component) of a first and/or second reference blocks associated with the CU.

Figure 19:
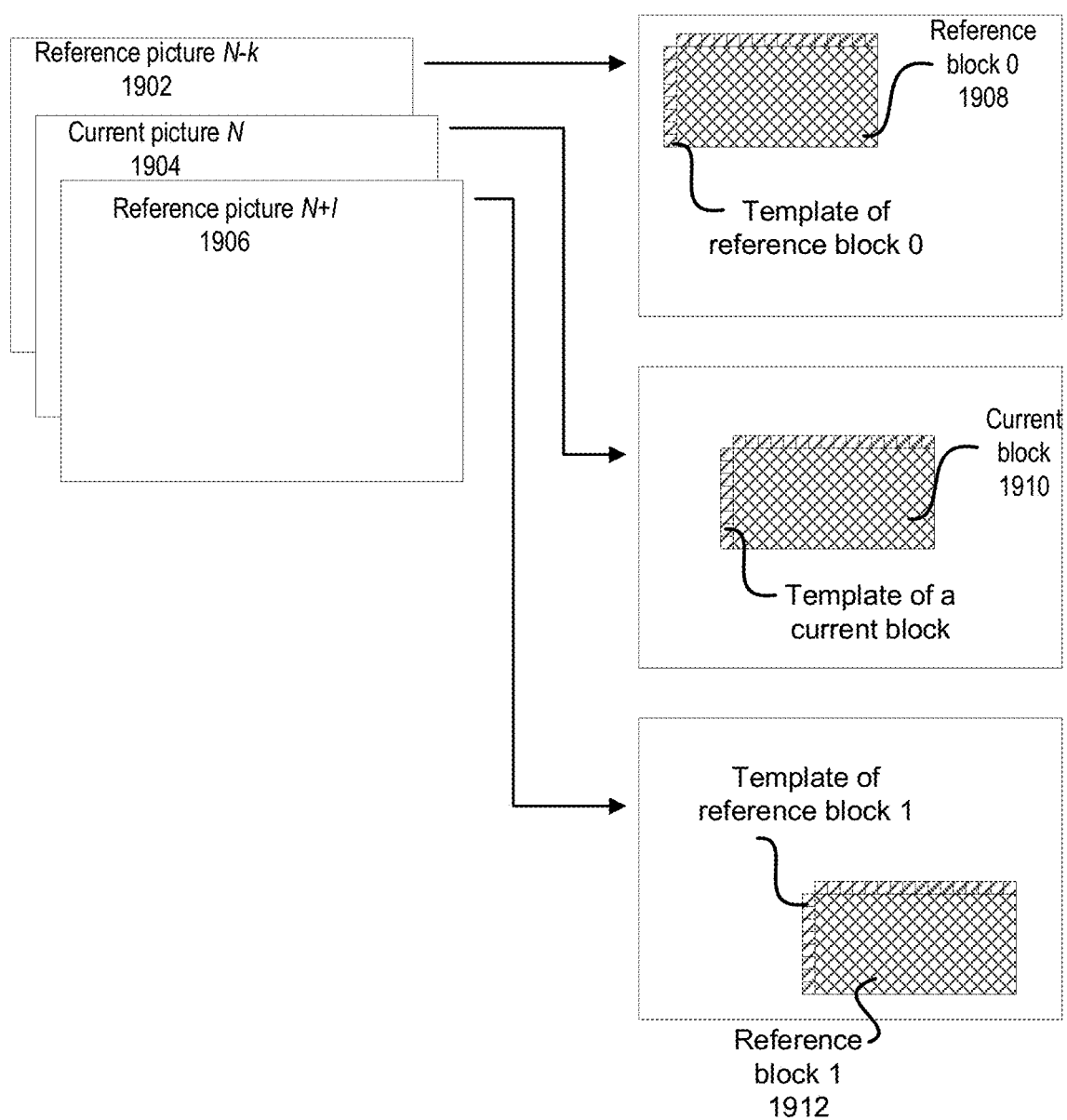
FIG. 19 shows an example of a differences computation for a TM cost based on a color component of the CU.

FIG. 19 shows an example of a differences computation for a TM cost based on a color component of the CU. More specifically, FIG. 19 shows an example of a SAD computation for a TM cost based on a color component of the CU illustrating bi-prediction for a non-low delay picture. The SAD computation method may be used, similarly, for a low delay picture. The same approach, furthermore, may be used, for example, for multi-hypothesis prediction or CIIP.

As shown in FIG. 19, a current block (e.g., current block 1910) of a current picture (N) 1904 may be predicted based on a reference block 0 (e.g., reference block 0 1908) of a reference picture (N−k) 1902 and a reference block 1 (e.g., reference block 1 1912) of a reference picture (N+l) 1906. The current block 1910, reference block 0 1908, and/or reference block 1 1912 may correspond to a given color component of the CU (e.g., luma). The SAD computation, for a given BCW weight, W, may include, for example, multiplying a template (e.g., neighboring reconstructed samples) of reference block 1 1912 with the BCW weight, W, and a template of reference block 0 1908 with the reciprocal of the BCW weight (1−W) and summing the weighted templates sample-by-sample to obtain samples of a weighted sum. The samples of the weighted sum may be subtracted sample-by-sample from a template (e.g., neighboring reconstructed samples) of the current block 1910. Absolute values of the differences obtained from the sample-by-sample subtraction may be summed to obtain a value corresponding to the SAD.

A TM cost calculated for a given BCW weight may be reduced. Step 1804, of FIG. 18, may further include reducing the determined TM cost for a BCW weight. The determined TM cost for a BCW weight may be reduced, for example, if the BCW weight is equal to a BCW weight associated with a merge candidate of the CU. The BCW weight may be equal to a BCW weight associated with a merge candidate of the CU, for example, if the CU is a merge coded CU. The determined TM cost may be multiplied, for example, by 0.90625 (e.g., reduced by 3/32). The insight behind this TM cost reduction is that the BCW weight inherited from a merge candidate may likely have a higher accuracy than another BCW weight.

A TM cost may be reduced, for example, if the BCW weight is equal to 4/8. The determined TM cost, for example, may be multiplied with 0.90625 (reduced by 3/32). The insight behind this TM cost reduction is that bi-prediction with equal weights may enable the use of Bi-Directional Optical Flow (BDOF).

Step 1806, of FIG. 18, may include selecting a BCW weight from a plurality of BCW weights for use in prediction of the CU. The BCW weight may be selected from the plurality of BCW weights, for example, based on the determined plurality of TM costs. The selected BCW weight may be associated with a minimum TM cost among the determined plurality of TM costs.

Figure 20:
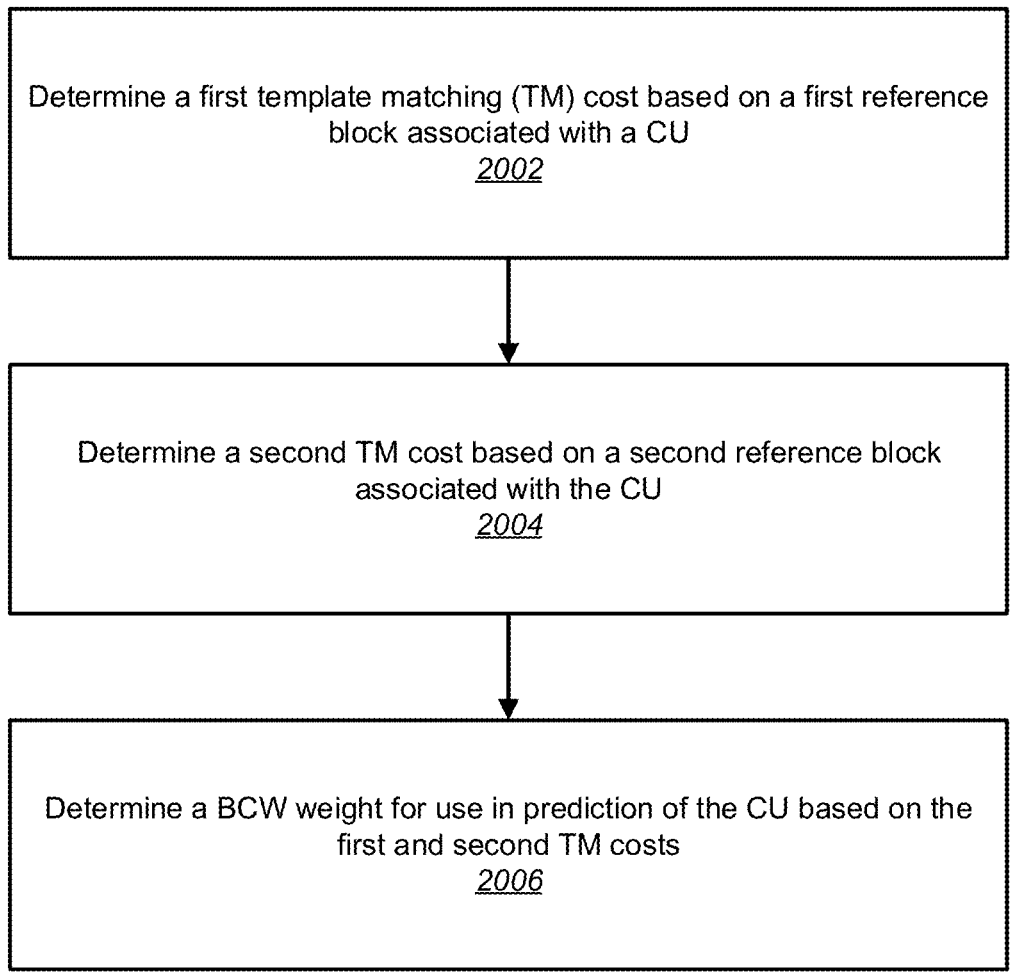
FIG. 20 shows an example method of using an enhanced TM cost function for BCW weight derivation.

The enhanced TM cost function, described herein, may be used to derive a BCW weight based on templates. The BCW weight may be derived independent of a list of pre-defined candidate weights. FIG. 20 shows an example method of using an enhanced TM cost function for BCW weight derivation. More specifically, FIG. 20 shows a flowchart 2000 of an example method that uses the enhanced TM cost function for BCW weight derivation. One or more steps of the example method shown in flowchart 2000 may be performed by an encoder (e.g., as described herein with respect to FIG. 2), and by a decoder (e.g., as described herein with respect to FIG. 3).

Step 2002, of FIG. 20, may include determining a first TM cost. The first TM cost may be determined, for example, based on a first reference block associated with the CU. The first reference block may be reference block 0 of a reference picture from reference picture list 0. Determining a first TM cost based on a first reference block may comprise determining a first TM cost based on: a first TM cost based on a first color component of a CU; and/or a second TM cost based on a second color component of the CU. The first TM cost based on the first color component, for example, may be based on a luma component of the CU. The second TM cost based on the second color component, for example, may be based on a chroma component of the CU. Determining the first TM cost based on the first reference block may comprise determining a first TM cost based on: a first TM cost based on a first color component of the CU; a second TM cost based on a second color component of the CU; and/or a third TM cost based on a third color component of the CU. The first TM cost, for example, may be based on a luma component of the CU; the second TM cost may be based on a Cb component; and/or the third TM cost may be based on a Cr component of the CU. Determining a first TM cost based on a first, second, and/or third TM costs may comprise determining the first TM using equation (19) or (20), as described herein, as a weighted sum of the first, second, and/or third TM costs.

A first, second, and/or third TM cost may be based on an SAD. The SAD may be calculated, for example, based on: a template of the first, second, and/or third color component of the CU; and/or a template of a first reference block associated with the CU.

Figure 21:
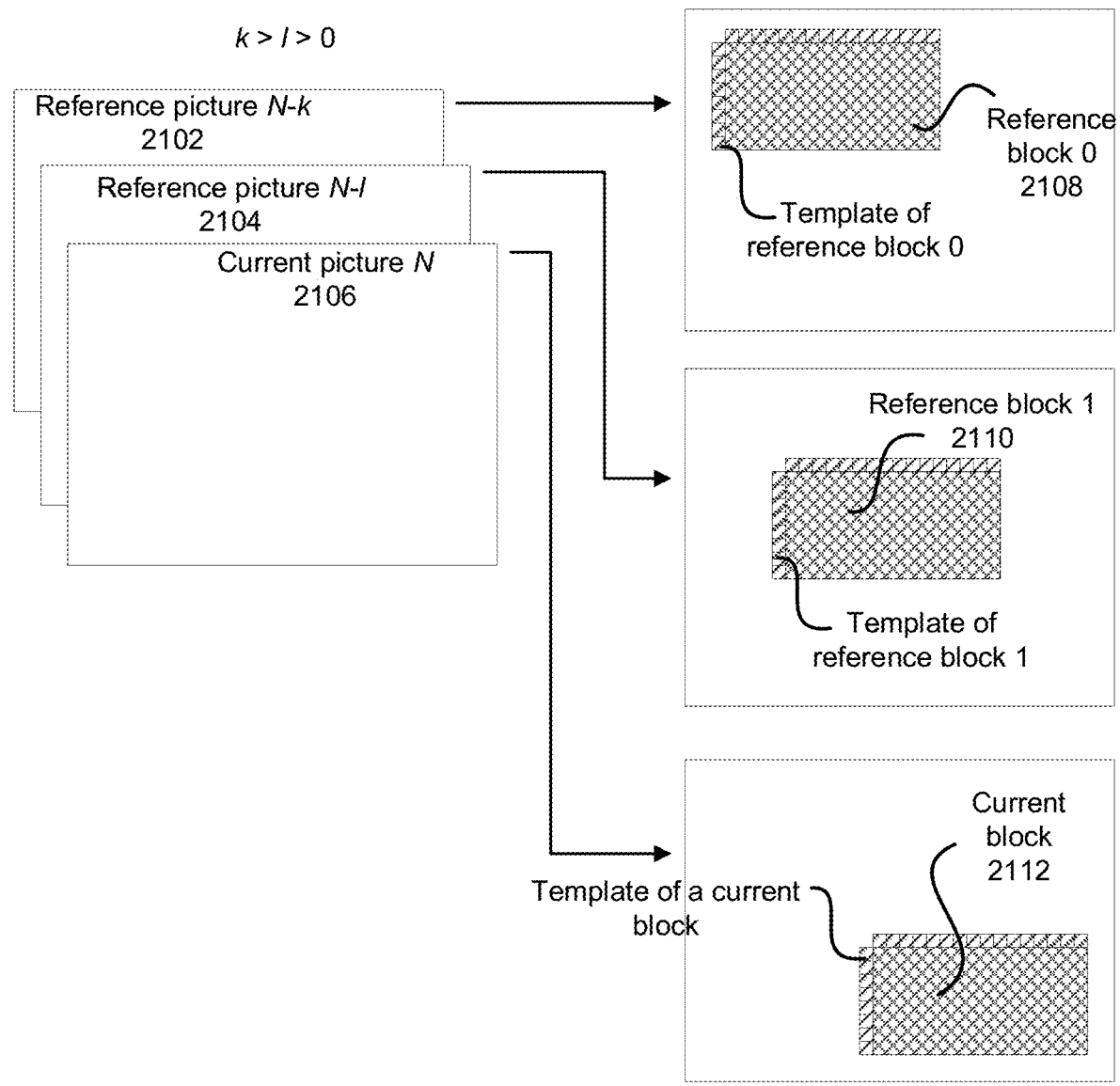
FIG. 21 shows an example of a differences computation for a first, second, and/or third TM cost.

FIG. 21 shows an example of a differences computation for a first, second, and/or third TM cost. More specifically, FIG. 21 shows an example of a SAD computation for a first, second, and/or third TM cost illustrating bi-prediction for a low delay picture. A SAD computation method may be used, for example, in a similar manner for a low delay picture. A SAD computation method, furthermore, may be used, for example, for multi-hypothesis prediction or CIIP.

Referring to FIG. 21, a current block 2112 of a current picture (N) 2106 may be predicted, for example, based on a reference block 0 2108 of a reference picture (N−k) 2102 and a reference block 1 2110 of a reference picture (N−l) 2104 (k>l>0). The current block 2112, reference block 0 2108, and/or reference block 1 2110 may correspond to a given color component of a CU (e.g., luma). A SAD computation may include subtracting sample-by-sample a template of reference block 0 2108 from a template of the current block 2112, for example, based on a first reference block (e.g., reference block 0 2108). Absolute values of the differences obtained from the sample-by-sample subtraction may be summed to obtain a value corresponding to the SAD.

This process may be repeated for other color components (e.g., Cb and/or Cr) of the CU to obtain respective TM costs based on the first reference block (e.g., reference block 0 2108). The obtained TM costs may be weight summed (e.g., using equation (19) and/or (20), as described herein), to obtain a first TM cost based on a first reference block associated with the CU.

Returning to FIG. 20, step 2004 may include determining a second TM cost based on a second reference block associated with a CU. The second reference block may, for example, be reference block 1 of a reference picture from reference picture list 1. Step 2004, of FIG. 20, may be similar to step 2002 as described herein, and may be performed with respect to the second reference block associated with the CU.

Step 2006, of FIG. 20, may include determining a BCW weight for use in prediction of a CU, for example, based on a first and a second TM costs. Determining a BCW weight based on the first and second TM costs may comprise, for example, determining respective weighting factors for the first reference block and the second reference block based on the first TM cost and the second TM cost. The respective weighting factors may be determined based on similarities between each of the first and the second reference blocks and the current block of the CU. The respective weighting factors may be determined as described, for example, in section III.B of "J. Mao, Y. Zhao, W. Xu and L. Yu. "Adaptive Weighted Bi-Prediction based on Template Similarity in Video Coding," 2018 *IEEE Visual Communications and Image Processing* (*VCIP*). 2018," which is incorporated herein by reference. The BCW weight may correspond to one of the respective weighting factors.

Figure 22:
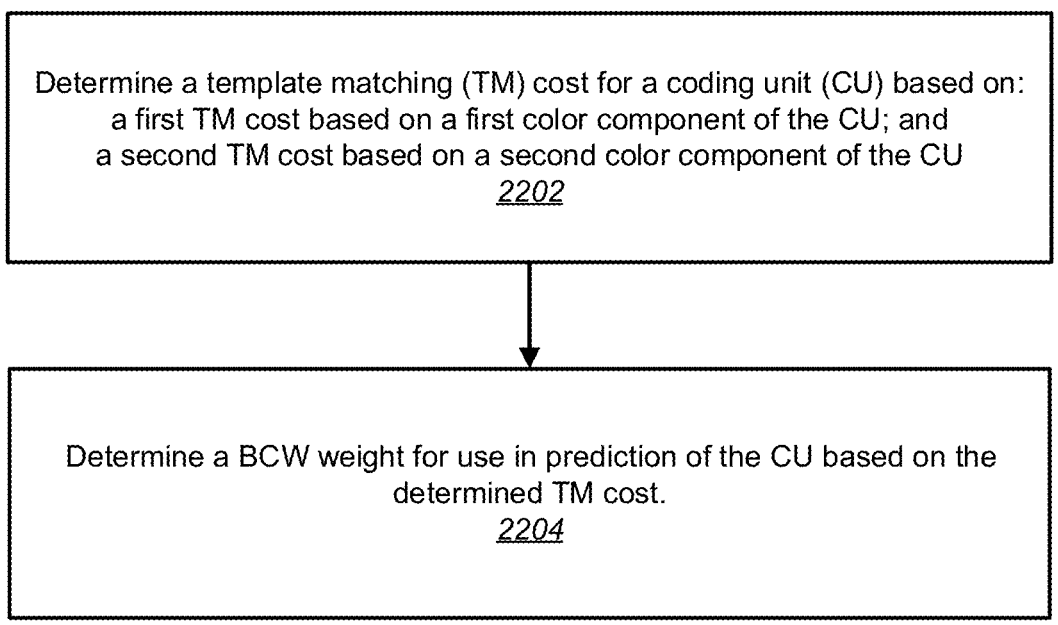
FIG. 22 shows an example method for determining a BCW weight for use in predicting a CU.

FIG. 22 shows an example method for determining a BCW weight for use in predicting a CU. More specifically, FIG. 22 shows an example flowchart 2200 of an example method for determining a BCW weight for use in a prediction of a CU. One or more steps of the method shown in flowchart 2200 may be performed by an encoder (e.g., as described herein with respect to FIG. 2) and/or by a decoder (e.g., as described herein with respect to FIG. 3). Step 2202, of FIG. 22, may include determining a TM cost for a CU based on: a first TM cost and a second TM cost. The first TM cost may be based on a first color component of the CU, and the second TM cost may be based on a second color component.

The example method described herein with respect to flowchart 2000 may further comprise determining a plurality of BCW weights for the CU, and/or determining a plurality of TM costs for the plurality of BCW weights. The plurality of TM costs may comprise the TM cost as determined at step 2202 of FIG. 22. The TM cost, as determined at step 2202 of FIG. 22, may be based on a respective BCW weight of the plurality of BCW weights.

A first and/or second TM cost may be based on a sum of absolute differences (SAD). The sum of absolute differences may be based on: a template of the first, and/or second color component; and a weighted sum. The weighted sum may be based on a respective BCW weight of templates of first and second reference blocks associated with the CU. The weighted sum may be, for example, based on a respective BCW weight of templates for the first and/or the second color components.

The example method described herein with respect to flowchart 2200 may further comprise reducing a TM cost determined at step 2202 of FIG. 22. The determined TM cost may be reduced, for example, if the CU is a merge coded CU. The determined TM cost may be reduced, for example, if the respective BCW weight (e.g., as based on the determined TM cost) is equal to a BCW weight associated with a merge candidate of the CU. A determined TM cost may be reduced, for example, if the respective BCW weight (e.g., based on the determined TM cost) is equal to 4/8.

The example method described herein with respect to flowchart 2200 may further comprise obtaining an initial BCW weight. The initial BCW weight may correspond to a derived, received, and/or inherited BCW weight. An initial BCW weight may correspond to a BCW weight associated with a merge candidate of the CU, for example, for a merge coded CU. An initial BCW weight may be derived by the encoder (e.g., from a list of pre-defined candidate BCW weights) and/or received by a decoder in a video bitstream, for example, for a non-merge coded CU.

A plurality of BCW weights may comprise an initial BCW weight and one or more neighboring weights in a list of candidate BCW weights. The plurality of BCW weights may comprise, for example: an initial BCW weight; a BCW weight that may be immediately lower than the initial BCW weight in the list of candidate BCW weights; and a BCW weight that may be immediately higher than the initial BCW weight in the list of candidate BCW weights. A list of candidate BCW weights may comprise $\{-2/8, 3/8, 4/8, 5/8,$ and $10/8\}$, and the weights may be used, for example, if the CU is associated with a low delay picture. A list of candidate BCW weights may comprise $\{3/8, 4/8,$ and $5/8\}$, and the weights may be used, for example, if the CU is associated with a non-low delay picture.

A TM cost determined at step 2202, of FIG. 22, may be based on a first reference block (e.g., reference block 0 of a reference picture from picture list 0) associated with a CU. The first and/or second TM cost (e.g., based on the determined TM cost) may be based on a sum of absolute differences (SAD). The sum of absolute differences (SAD) may be based on: a template of the first and/or second color component of the CU; and a template of the first reference block associated with the CU.

The example method described herein with respect to flowchart 2200 may further comprise determining a further TM cost for a CU based on a third TM cost and a fourth TM cost. The third TM cost may be based on a first color component of the CU, and the fourth TM cost may be based on a second color component of the CU. The further TM cost may be based on a second reference block (e.g., reference block 1 of a reference picture from picture list 1) associated with the CU.

Returning to FIG. 22, step 2204 may include determining a BCW weight for prediction of the CU based on the determined TM cost. Step 2204 may comprise selecting the BCW weight from a plurality of BCW weights based on the determined plurality of TM costs. Step 2204 may comprise selecting the BCW weight from a plurality of BCW weights based on the determined plurality of TM costs, for example, if the TM cost determined at step 2202 corresponds to one of a plurality of TM costs based on a plurality of BCW weights. The selected BCW weight may be associated with a minimum TM cost among the determined plurality of TM costs.

Step 2204 may comprise determining a BCW weight based on a determined TM cost (e.g., determined based on a first reference block) and/or the further TM cost (e.g., determined based on a second reference block). Determining the BCW weight based on the determined TM cost and/or the further TM cost may comprise determining respective weighting factors for the first and/or second reference blocks, for example, based on the determined TM cost and/or the further TM cost. The respective weighting factors for the first and/or second reference blocks may be determined, for example, based on respective similarities between each the first and/or second reference blocks and/or a current block of the CU. The BCW weight for use in the prediction of the CU may correspond to one of the respective weighting factors.

A first color component may comprise a luma block of a CU, and a second color component may comprise a chroma block of the CU. The chroma block may comprise a Cb and/or a Cr block. The luma block and/or the chroma block may be collocated. Alternatively, the first color component may comprise one of a red color block, a green color block, or a blue color block of the CU. The second color may comprise one of the red color block, the green color block, or the blue color block of CU, of a different color than the first color component.

The example method described herein with respect to flowchart 2200 may comprise determining a third TM cost based on a third color component of a CU. The third TM cost may be determined, for example, based on a BCW weight and/or for a first reference block associated with the CU. A TM cost at step 2202 may be determined, for example, based on: a first TM cost, a second TM cost, and/or a third TM cost. The first TM cost may be based on a first color component of a CU, the second TM cost may be based on a second color component of the CU, and/or the third TM cost may be based on a third color component of the CU. The first color component may comprise a luma block of the CU, the second color component may comprise a Cb chroma block of the CU, and/or the third color component may comprise a Cr chroma block of the CU. Alternatively, the first color component may comprise a red color block of the CU, the second color component may comprise a green color block of the CU, and/or the third color component may comprise a blue color block of the CU.

A TM cost may be determined as a weighted sum of a first, second, and/or third TM cost. Thus, the example method described herein with respect to flowchart 2200 may comprise selecting respective weighting coefficients for the first, second, and/or third TM costs. The respective weighting coefficients may be selected, for example, based on a chroma format of a CU. The respective weighting coefficients may be selected based on a chroma format of a CU, for example, if the CU is of the YCbCr type. Selecting respective weighting coefficients based on a chroma format of a CU may comprise, for example, selecting a weighting coefficient for a second and/or third TM cost based on a ratio of a number of samples of the Cb and/or Cr chroma block to a number of samples of a luma block of the CU. Respective weighting coefficients may be selected, for example, based on a content resolution of a video sequence comprising the CU. Selecting respective weighting coefficients based on the content resolution of a video sequence comprising the CU may comprise, for example, selecting a weighting coefficient for the second and/or third TM cost using a function that is inversely proportional to the content resolution of the video sequence comprising the CU. Respective weighting coefficients may be selected, for example, based on respective bit depths of the first, second, and/or third color components.

As described herein, a determined BCW weight may be used in a prediction of a CU. The prediction of a CU may include, for example, bi-prediction, multi-hypothesis prediction, and/or CIIP. The example method described herein with respect to flowchart 2200 may further comprise determining a weighted average of first and/or second reference blocks associated with the CU to obtain a prediction of the CU, for example, where the prediction of the CU comprises bi-prediction. The weighted average of the first and/or the second reference blocks associated with the CU may be determined, for example, based on the determined BCW weight. The example method described herein with respect to flowchart 2200 may further comprise determining a weighted average of more than two reference blocks associated with the CU to obtain a prediction of the CU, for example, if the prediction of the CU comprises multi-hypothesis prediction. The weighted average of more than two reference blocks associated with the CU may be determined, for example, based on the determined BCW weight. The example method described herein with respect to flowchart 2200 may further comprise determining a weighted average of a first intra reference block and/or a second inter reference block associated with the CU to obtain a prediction of the CU, for example, if the prediction of the CU comprises CIIP. The weighted average of the first intra reference block and/or the second inter reference block associated with the CU may be determined, for example, based on the determined BCW weight.

Figure 23:
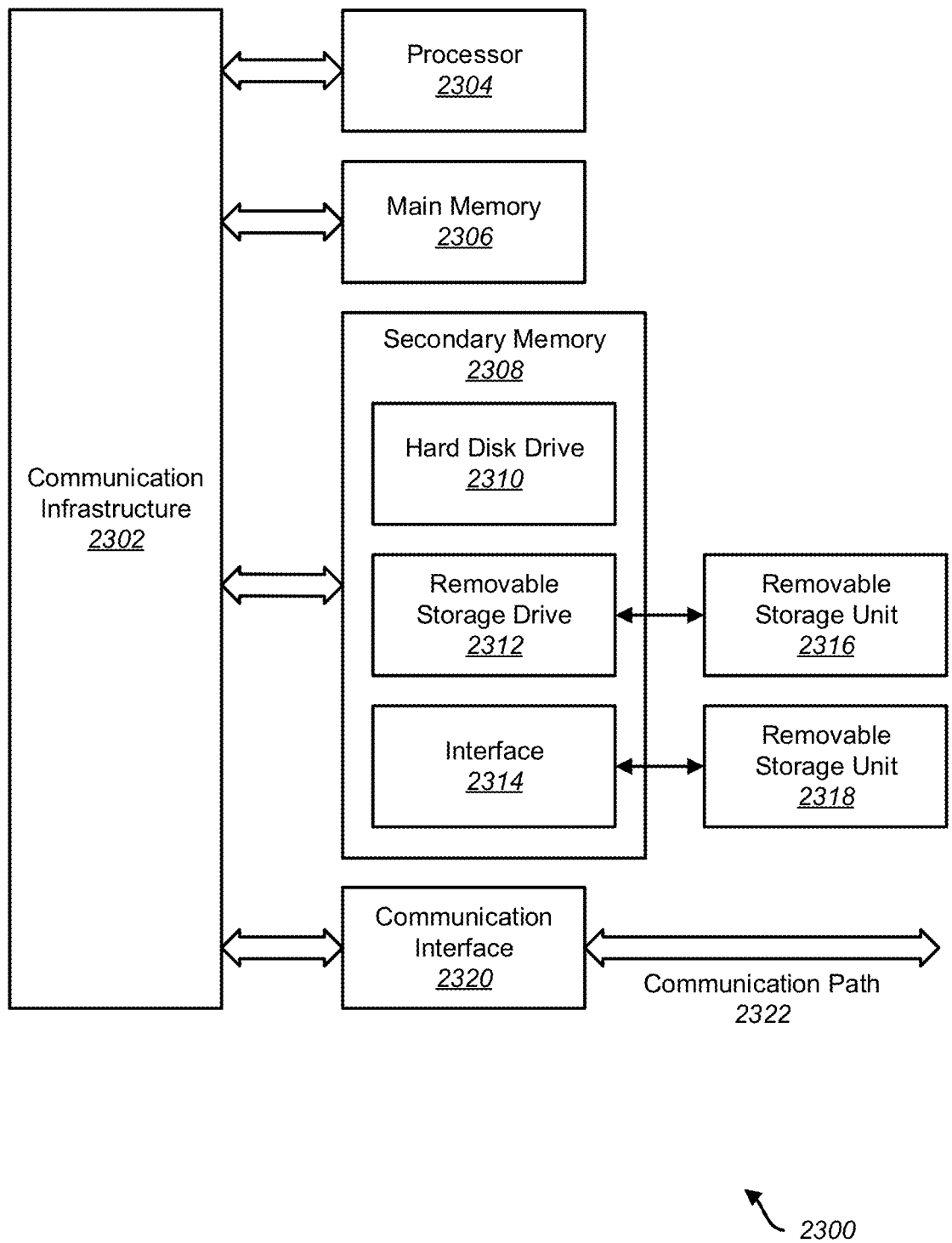
FIG. 23 shows a block diagram of an example computer system in which embodiments of the present disclosure may be implemented.

FIG. 23 shows an example computer system in which examples of the present disclosure may be implemented. For example, the example computer system 2300 shown in FIG. 23 may implement one or more of the methods described herein. For example, various devices and/or systems described herein (e.g., in FIGS. 1, 2, and 3) may be implemented in the form of one or more computer systems 2300. Furthermore, each of the steps of the flowcharts depicted in this disclosure may be implemented on one or more computer systems 2300.

The computer system 2300 may comprise one or more processors, such as a processor 2304. The processor 2304 may be a special purpose processor, a general purpose processor, a microprocessor, and/or a digital signal processor. The processor 2304 may be connected to a communication infrastructure 2302 (for example, a bus or network). The computer system 2300 may also comprise a main memory 2306 (e.g., a random access memory (RAM)), and/or a secondary memory 2308.

The secondary memory 2308 may comprise a hard disk drive 2310 and/or a removable storage drive 2312 (e.g., a magnetic tape drive, an optical disk drive, and/or the like). The removable storage drive 2312 may read from and/or write to a removable storage unit 2316. The removable storage unit 2316 may comprise a magnetic tape, optical disk, and/or the like. The removable storage unit 2316 may be read by and/or may be written to the removable storage drive 2312. The removable storage unit 2316 may comprise a computer usable storage medium having stored therein computer software and/or data.

The secondary memory 2308 may comprise other similar means for allowing computer programs or other instructions to be loaded into the computer system 2300. Such means may include a removable storage unit 2318 and/or an interface 2314. Examples of such means may comprise a program cartridge and/or cartridge interface (such as in video game devices), a removable memory chip (such as an erasable programmable read-only memory (EPROM) or a programmable read-only memory (PROM)) and associated socket, a thumb drive and USB port, and/or other removable storage units 2318 and interfaces 2314 which may allow software and/or data to be transferred from the removable storage unit 2318 to the computer system 2300.

The computer system 2300 may also comprise a communications interface 2320. The communications interface 2320 may allow software and data to be transferred between the computer system 2300 and external devices. Examples of the communications interface 2320 may include a modem, a network interface (e.g., an Ethernet card), a communications port, etc. Software and/or data transferred via the communications interface 2320 may be in the form of signals which may be electronic, electromagnetic, optical, and/or other signals capable of being received by the communications interface 2320. The signals may be provided to the communications interface 2320 via a communications path 2322. The communications path 2322 may carry signals and may be implemented using wire or cable, fiber optics, a phone line, a cellular phone link, an RF link, and/or any other communications channel(s).

A computer program medium and/or a computer readable medium may be used to refer to tangible storage media, such as removable storage units 2316 and 2318 or a hard disk installed in the hard disk drive 2310. The computer program products may be means for providing software to the computer system 2300. The computer programs (which may also be called computer control logic) may be stored in the main memory 2306 and/or the secondary memory 2308. The computer programs may be received via the communications interface 2320. Such computer programs, when executed, may enable the computer system 2300 to implement the present disclosure as discussed herein. In particular, the computer programs, when executed, may enable the processor 2304 to implement the processes of the present disclosure, such as any of the methods described herein. Accordingly, such computer programs may represent controllers of the computer system 2300.

Figure 24:
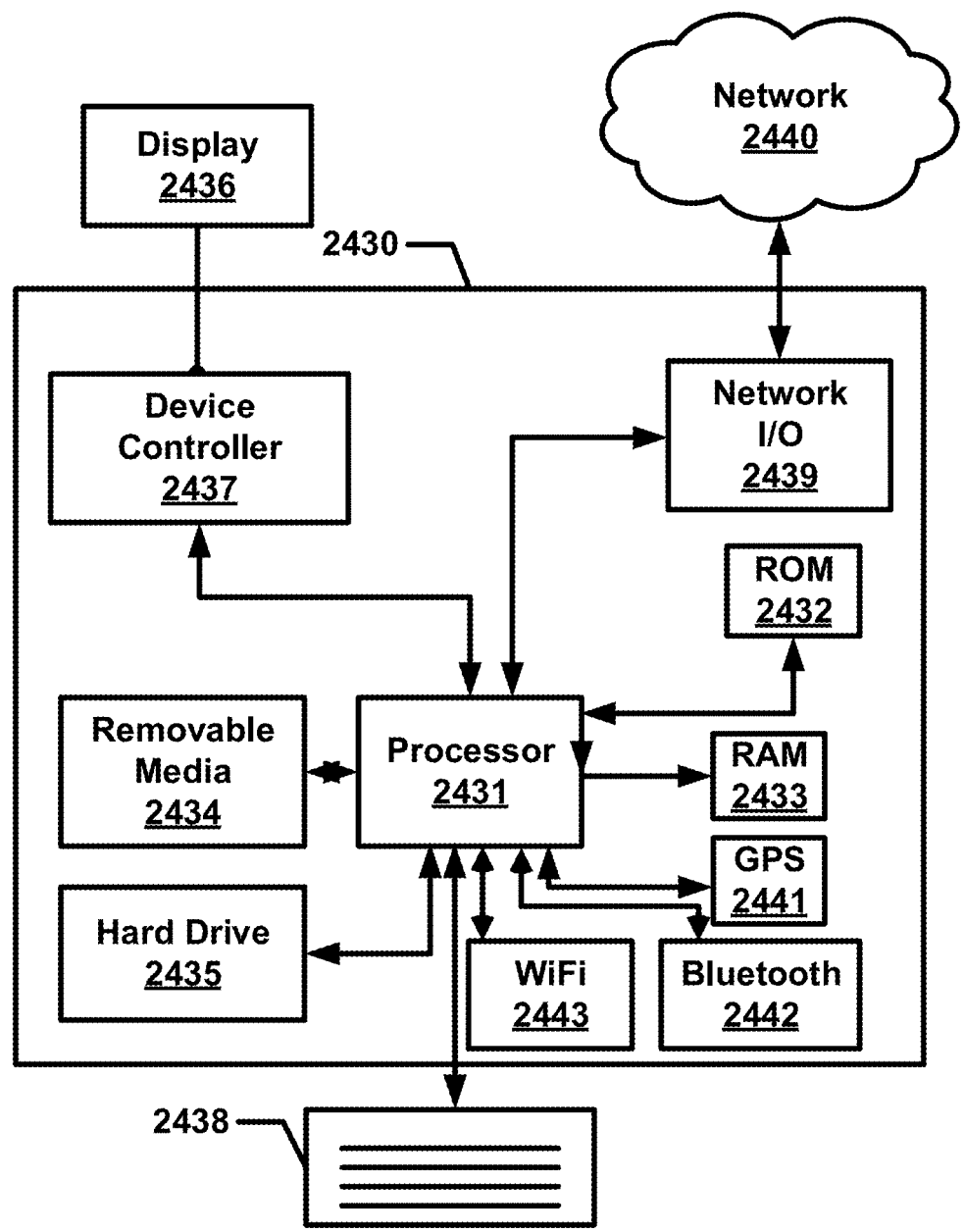
FIG. 24 shows example elements of a computing device that may be used to implement any of the various devices described herein.

FIG. 24 shows example elements of a computing device that may be used to implement any of the various devices described herein, including, for example, a source device (e.g., 102), an encoder (e.g., 200), a destination device (e.g., 106), a decoder (e.g., 300), and/or any computing device described herein. The computing device 2430 may include one or more processors 2431, which may execute instructions stored in the random-access memory (RAM) 2433, the removable media 2434 (such as a Universal Serial Bus (USB) drive, compact disk (CD) or digital versatile disk (DVD), or floppy disk drive), or any other desired storage medium. Instructions may also be stored in an attached (or internal) hard drive 2435. The computing device 2430 may also include a security processor (not shown), which may execute instructions of one or more computer programs to monitor the processes executing on the processor 2431 and any process that requests access to any hardware and/or software components of the computing device 2430 (e.g., ROM 2432, RAM 2433, the removable media 2434, the hard drive 2435, the device controller 2437, a network interface 2439, a GPS 2441, a Bluetooth interface 2442, a WiFi interface 2443, etc.). The computing device 2430 may include one or more output devices, such as the display 2436 (e.g., a screen, a display device, a monitor, a television, etc.), and may include one or more output device controllers 2437, such as a video processor. There may also be one or more user input devices 2438, such as a remote control, keyboard, mouse, touch screen, microphone, etc. The computing device 2430 may also include one or more network interfaces, such as a network interface 2439, which may be a wired interface, a wireless interface, or a combination of the two. The network interface 2439 may provide an interface for the computing device 2430 to communicate with a network 2440 (e.g., a RAN, or any other network). The network interface 2439 may include a modem (e.g., a cable modem), and the external network 2440 may include communication links, an external network, an in-home network, a provider's wireless, coaxial, fiber, or hybrid fiber/coaxial distribution system (e.g., a DOCSIS network), or any other desired network. Additionally, the computing device 2430 may include a location-detecting device, such as a global positioning system (GPS) microprocessor 2441, which may be configured to receive and process global positioning signals and determine, with possible assistance from an external server and antenna, a geographic position of the computing device 2430.

The example in FIG. 24 may be a hardware configuration, although the components shown may be implemented as software as well. Modifications may be made to add, remove, combine, divide, etc. components of the computing device 2430 as desired. Additionally, the components may be implemented using basic computing devices and components, and the same components (e.g., processor 2431, ROM storage 2432, display 2436, etc.) may be used to implement any of the other computing devices and components described herein. For example, the various components described herein may be implemented using computing devices having components such as a processor executing computer-executable instructions stored on a computer-readable medium, as shown in FIG. 24. Some or all of the entities described herein may be software based, and may co-exist in a common physical platform (e.g., a requesting entity may be a separate software process and program from a dependent entity, both of which may be executed as software on a common computing device).

A computing device may perform a method comprising multiple operations. The computing device may determine a template matching (TM) cost for a coding unit (CU). A first TM cost may be based on a first color component of the CU. A second TM cost may be based on a second color component of the CU. Based on the determined TM cost, the computing device may determine a bidirectional prediction with coding unit weights (BCW) weight for use in a prediction of the CU. Based on the determined TM cost, the computing device may determine a plurality of BCW weights for the CU. The computing device may determine a plurality of TM costs for the plurality of BCW weights. The plurality of TM costs may comprise the determined TM cost. The first TM cost and the second TM cost may be determined using a sum of absolute differences (SAD) that may be based on a template of the first color component and the second color component, a weighted sum, based on a respective BCW weight, of templates of a first reference block and a second reference block associated with the CU. The CU may be a merge coded CU. The computing device may reduce the determined TM cost if a respective BCW weight is equal to a BCW weight associated with a merge candidate of the CU. The computing device may determine the BCW weight for use in the prediction of the CU using the determined TM cost and may be based on a determined plurality of TM costs, selecting the BCW weight from a plurality of BCW weights. The computing device may determine and/or obtain an initial BCW weight. The computing device may determine and/or obtain an initial BCW weight. The initial BCW weight may correspond to a BCW weight that may be associated with a merge candidate of the CU. The initial BCW weight may correspond to a received or derived BCW weight. The method may further comprise encoding a current block associated with the CU, or decoding a current block associated with the CU. The method may further comprise encoding a video sequence associated with the CU, or decoding a video sequence associated with the CU. The CU may be a YCbCr type, and the determining the TM may comprise selecting respective weighting coefficients for the first TM cost, the second TM cost, a third TM cost based on the chroma format of the CU, and calculating the TM cost as a weighted sum of the first TM cost, the second TM cost, and the third TM cost. The computing device may further determine a plurality of BCW weights. The plurality of BCW weights may comprise an initial BCW weight, a first BCW weight that may be immediately lower than the initial BCW weight in a list of candidate BCW weights, and/or a second BCW weight that may be immediately higher than the initial BCW weight in the list of candidate BCW weights. A third TM cost may be based on a first reference block associated with the CU. The first color component may comprise a luma block of the CU and the second color component may comprise a chroma block of the CU. The first color component may comprise one of a red color block, a green color block, or a blue color block of the CU. The second color component may comprise one of a red color block, a green color block, or a blue color block of the CU. The second color component may be different than the first color component. The computing device may encode and send (e.g., transmit) the prediction and/or receive and decode the prediction. The computing device may comprise one or more processors; and memory storing instructions that, when executed by the one or more processors, cause the computing device to perform the described method, additional operations and/or include the additional elements. A system may comprise a first computing device configured to perform the described method, additional operations and/or include the additional elements; and a second computing device configured to encode and send (e.g., transmit) the prediction. A system may comprise a first computing device configured to perform the described method, additional operations and/or include the additional elements; and a second computing device configured to receive and decode the prediction. A computer-readable medium may store instructions that, when executed, cause performance of the described method, additional operations and/or include the additional elements.

A computing device may perform a method comprising multiple operations. The computing device may determine a template matching (TM) cost for the CU, and based on the determined TM cost, may determine a bidirectional prediction with coding unit weights (BCW) weight that may be used in a prediction of the CU. The computing device may determine a TM cost based on a first reference block associated with a coding unit (CU). One or both of a first TM cost and a second TM cost may be a sum of absolute differences (SAD). Determination of the SAD may be based on a template of one or both of a first color component and/or a second color component of the CU and a template of the first reference block associated with the CU. A third TM cost may be based on a second reference block associated with the CU. Determining the BCW weight for use in the prediction of the CU may comprise determining the BCW weight based on the determined TM cost and/or a further TM cost. Respective weighting factors for a first reference block and a second reference block may be determined based on respective similarities between each of the first reference block and second reference block and a current block of the CU. The computing device may encode and send (e.g., transmit) the prediction and/or receive and decode the prediction. The computing device may comprise one or more processors; and memory storing instructions that, when executed by the one or more processors, cause the computing device to perform the described method, additional operations and/or include the additional elements. A system may comprise a first computing device configured to perform the described method, additional operations and/or include the additional elements; and a second computing device configured to encode and send (e.g., transmit) the prediction. A system may comprise a first computing device configured to perform the described method, additional operations and/or include the additional elements; and a second computing device configured to receive and decode the prediction. A computer-readable medium may store instructions that, when executed, cause performance of the described method, additional operations and/or include the additional elements.

A computing device may perform a method comprising multiple operations. The computing device may determine a template matching (TM) cost for a coding unit (CU) using a first TM cost that may be based on a first color component of the CU, and a second TM cost that may be based on a second color component of the CU. The first color component may comprise a luma block of the CU. The second color component may comprise a chroma block of the CU. The computing device may determine a bidirectional prediction with coding unit weights (BCW) weight that may be used in a prediction of the CU based on the determined TM cost. The chroma block may comprise a Cb or a Cr block. The luma block and a chroma block may be collocated. The computing device may encode and send (e.g., transmit) the prediction and/or receive and decode the prediction. The computing device may comprise one or more processors; and memory storing instructions that, when executed by the one or more processors, cause the computing device to perform the described method, additional operations and/or include the additional elements. A system may comprise a first computing device configured to perform the described method, additional operations and/or include the additional elements; and a second computing device configured to encode and send (e.g., transmit) the prediction. A system may comprise a first computing device configured to perform the described method, additional operations and/or include the additional elements; and a second computing device configured to receive and decode the prediction. A computer-readable medium may store instructions that, when executed, cause performance of the described method, additional operations and/or include the additional elements.

A computing device may perform a method comprising multiple operations. The computing device may determine a template matching (TM) cost for a coding unit (CU). A first TM cost may be based on a first color component of the CU. A second TM cost may be based on a second color component of the CU. The computing device may determine a bidirectional prediction with coding unit weights (BCW) weight for use in a prediction of the CU based on the determined TM cost. The computing device may determine a plurality of BCW weights for the CU and/or may determine a plurality of TM costs for the plurality of BCW weights. The computing device may determine a plurality of BCW weights for the CU. The determined TM cost may be based on a respective BCW weight of the plurality of BCW weights. The computing device may determine a plurality of TM costs for the plurality of BCW weights. The computing device may reduce the determined TM cost if a respective BCW weight is equal to $4/8$. Determining the BCW weight that may be used in prediction of the CU based on the determined TM cost may comprise selecting the BCW weight from a plurality of BCW weights based on a minimum TM cost among a determined plurality of TM costs. The computing device may determine a plurality of BCW weights. The plurality of BCW weights may comprise a list of candidate BCW weights that may comprise $\{-2/8, 3/8, 4/8, 5/8, \text{and } 10/8\}$. The plurality of BCW weights may comprise a list of candidate BCW weights that may comprise $\{-2/8, 3/8, 4/8, 5/8, \text{and } 10/8\}$. The CU may be associated with a low delay picture. The plurality of BCW weights may comprise a list of candidate BCW weights comprising $\{3/8, 4/8, \text{and } 5/8\}$. The plurality of BCW weights may comprise a list of candidate BCW weights comprising $\{3/8, 4/8, \text{and } 5/8\}$. The CU may be associated with a non-low delay picture. The computing device may determine a TM cost for the CU using a third TM cost that may be based on the first color component of the CU, and a fourth TM cost that may be based on the second color component of the CU. The computing device may determine the BCW weight that may be based on the determined TM cost and the further TM cost may comprise determining respective weighting factors for a first reference block and a second reference block that may be based on the determined TM cost and a further TM cost. The BCW weight may correspond to one of a plurality of respective weighting factors. The computing device may determine the TM cost based on the first TM cost using the first color component of the CU, the second TM cost using the second color component of the CU, and/or a third TM cost based on a third color component of the CU. The first color component may comprise a luma block of the CU, the second color component may comprise a Cb chroma block of the CU, and/or a third color component may comprise a Cr chroma block of the CU. The first color component may comprise a red color block of the CU, the second color component may comprise a green color block of the CU, and/or a third color component may comprise a blue color block of the CU. Determining the TM cost may comprise calculating the TM cost as a weighted sum of the first TM cost, the second TM cost, and/or a third TM cost. Determining the TM cost may comprise selecting respective weighting coefficients for the first TM cost, the second TM cost, and/or a third TM cost and/or may comprise calculating the TM cost as a weighted sum of the first TM cost, the second TM cost, and/or the third TM cost. Determining the TM cost may comprise selecting respective weighting coefficients for the first TM cost, the second TM cost, and/or a third TM cost, if the CU is of the YCbCr type. Selecting the respective weighting coefficients may be based on a chroma format of the CU. Selecting respective weighting coefficients based on a chroma format of the CU may comprise selecting a weighting coefficient for one of both of the second TM cost and the third TM cost based on a ratio of a number of samples of one or both of a Cb or a Cr chroma block of the CU to a number of samples of a luma block of the CU. Calculating the TM cost may be as a weighted sum of the first TM cost, the second TM cost, and/or the third TM cost. Determining the TM cost may comprises selecting respective weighting coefficients that may be for the first TM cost, the second TM cost, and/or a third TM cost. Selecting the respective weighting coefficients may be based on a content resolution of a video sequence comprising the CU and/or calculating the TM cost may be as a weighted sum of the first TM cost, the second TM cost, and/or the third TM cost. Determining the TM cost may comprise selecting respective weighting coefficients for the first TM cost, the second TM cost, and/or a third TM cost. Selecting the respective weighting coefficients may be based on a content resolution of a video sequence comprising the CU that may comprise selecting a weighting coefficient for the second TM cost and the third TM cost that may use a function that may be inversely proportional to the content resolution of the video sequence comprising the CU. Calculating the TM cost may be as a weighted sum of the first TM cost, the second TM cost, and/or the third TM cost. Determining the TM cost may comprise selecting respective weighting coefficients for the first TM cost, the second TM cost, and/or a third TM cost that may be based on respective bit depths of the first color component, the second color component, and/or a third color component. The TM cost may be determined as a weighted sum of the first TM cost, the second TM cost, and/or the third TM cost. The CU may comprise a merge coded CU. The prediction of the CU may comprise bi-prediction, multi-hypothesis prediction, and/or Combined Intra/Inter Prediction (CIIP). The prediction of the CU may comprise bi-prediction. Determining the prediction may comprise determining a weighted average that may be of a first reference block and a second reference block associated with the CU and may be based on the determined BCW weight. The prediction of the CU may comprise multi-hypothesis prediction. Determining the prediction may comprise determining a weighted average that may be of two or more reference blocks associated with the CU and may be based on the determined BCW weight. The prediction of the CU may comprises CIIP. Determining the prediction may comprise determining a weighted average that may be of a first intra reference block and a second inter reference block associated with the CU and may be based on the determined BCW weight. The computing device may encode and send (e.g., transmit) the prediction and/or receive and decode the prediction. The computing device may comprise one or more processors; and memory storing instructions that, when executed by the one or more processors, cause the computing device to perform the described method, additional operations and/or include the additional elements. A system may comprise a first computing device configured to perform the described method, additional operations and/or include the additional elements; and a second computing device configured to encode and send (e.g., transmit) the prediction. A system may comprise a first computing device configured to perform the described method, additional operations and/or include the additional elements; and a second computing device configured to receive and decode the prediction. A computer-readable medium may store instructions that, when executed, cause performance of the described method, additional operations and/or include the additional elements.

One or more examples herein may be described as a process which may be depicted as a flowchart, a flow diagram, a data flow diagram, a structure diagram, and/or a block diagram. Although a flowchart may describe operations as a sequential process, one or more of the operations may be performed in parallel or concurrently. The order of the operations shown may be re-arranged. A process may be terminated when its operations are completed, but could have additional steps not shown in a figure. A process may correspond to a method, a function, a procedure, a subroutine, a subprogram, etc. If a process corresponds to a function, its termination may correspond to a return of the function to the calling function or the main function.

Operations described herein may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable medium. A processor(s) may perform the necessary tasks. Features of the disclosure may be implemented in hardware using, for example, hardware components such as application-specific integrated circuits (ASICs) and gate arrays. Implementation of a hardware state machine to perform the functions described herein will also be apparent to persons skilled in the art.

One or more features described herein may be implemented in a computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. The functionality of the program modules may be combined or distributed as desired. The functionality may be implemented in whole or in part in firmware or hardware equivalents such as integrated circuits, field programmable gate arrays (FPGA), and the like. Particular data structures may be used to more effectively implement one or more features described herein, and such data structures are contemplated within the scope of computer executable instructions and computer-usable data described herein. Computer-readable medium may comprise, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

A non-transitory tangible computer readable media may comprise instructions executable by one or more processors configured to cause operations described herein. An article of manufacture may comprise a non-transitory tangible computer readable machine-accessible medium having instructions encoded thereon for enabling programmable hardware to cause a device (e.g., an encoder, a decoder, a transmitter, a receiver, and the like) to allow operations described herein. The device, or one or more devices such as in a system, may include one or more processors, memory, interfaces, and/or the like.

Communications described herein may be determined, generated, sent, and/or received using any quantity of messages, information elements, fields, parameters, values, indications, information, bits, and/or the like. While one or more examples may be described herein using any of the terms/phrases message, information element, field, parameter, value, indication, information, bit(s), and/or the like, one skilled in the art understands that such communications may be performed using any one or more of these terms, including other such terms. For example, one or more parameters, fields, and/or information elements (IEs), may comprise one or more information objects, values, and/or any other information. An information object may comprise one or more other objects. At least some (or all) parameters, fields, IEs, and/or the like may be used and can be interchangeable depending on the context. If a meaning or definition is given, such meaning or definition controls.

One or more elements in examples described herein may be implemented as modules. A module may be an element that performs a defined function and/or that has a defined interface to other elements. The modules may be implemented in hardware, software in combination with hardware, firmware, wetware (e.g., hardware with a biological element) or a combination thereof, all of which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. Additionally or alternatively, it may be possible to implement modules using physical hardware that incorporates discrete or programmable analog, digital and/or quantum hardware. Examples of programmable hardware may comprise: computers, microcontrollers, microprocessors, application-specific integrated circuits (ASICs); field programmable gate arrays (FPGAs); and/or complex programmable logic devices (CPLDs). Computers, microcontrollers and/or microprocessors may be programmed using languages such as assembly, C, C++ or the like. FPGAs, ASICs and CPLDs are often programmed using hardware description languages (HDL), such as VHSIC hardware description language (VHDL) or Verilog, which may configure connections between internal hardware modules with lesser functionality on a programmable device. The above-mentioned technologies may be used in combination to achieve the result of a functional module.

One or more of the operations described herein may be conditional. For example, one or more operations may be performed if certain criteria are met, such as in computing device, a communication device, an encoder, a decoder, a network, a combination of the above, and/or the like. Example criteria may be based on one or more conditions such as device configurations, traffic load, initial system set up, packet sizes, traffic characteristics, a combination of the above, and/or the like. If the one or more criteria are met, various examples may be used. It may be possible to implement any portion of the examples described herein in any order and based on any condition.

Although examples are described above, features and/or steps of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the descriptions herein. Accordingly, the foregoing description is by way of example only, and is not limiting.

What is claimed is:

1. A method comprising:
 determining, by a computing device, a template matching (TM) cost for a coding unit (CU), associated with content, based on:
  a first TM cost associated with a first color component of the CU; and
  a second TM cost associated with a second color component of the CU; and
 determining, based on the determined TM cost, a bidirectional prediction with coding unit weights (BCW) weight for predicting the CU.

2. The method of claim 1, further comprising:
 determining a plurality of BCW weights for the CU; and
 determining a plurality of TM costs for the plurality of BCW weights, wherein the plurality of TM costs comprise the determined TM cost.

3. The method of claim 1, wherein the first TM cost or the second TM cost is determined, based on a sum of absolute differences (SAD), using:
 a template of the first color component or the second color component; and a weighted sum, based on a respective BCW weight, of templates of a first reference block associated with the CU and a second reference block associated with the CU.

4. The method of claim 3, wherein the CU is a merge coded CU and further comprising:
determining that the respective BCW weight is equal to a BCW weight associated with a merge candidate of the CU; and
reducing the determined TM cost based on the determining that the respective BCW weight is equal to the BCW weight associated with the merge candidate of the CU.

5. The method of claim 1, wherein the determining the BCW weight comprises:
determining a plurality of TM costs for a plurality of BCW weights for the CU; and
based on the determined plurality of TM costs, selecting the BCW weight from the plurality of BCW weights.

6. The method of claim 1, further comprising:
obtaining an initial BCW weight, wherein the initial BCW weight corresponds to one of
a BCW weight associated with a merge candidate of the CU;
a received BCW weight; or
a derived BCW weight.

7. The method of claim 1, further comprising:
encoding a current block associated with the CU based on a prediction block determined using the determined BCW weight; or decoding a current block associated with the CU based on the prediction block determined using the determined BCW weight.

8. The method of claim 1, wherein the CU is of a YCbCr type, and wherein determining the TM cost comprises:
selecting, based on a chroma format of the CU, respective weighting coefficients for the first TM cost, the second TM cost, and a third TM cost; and
calculating the TM cost as a weighted sum of the first TM cost, the second TM cost, and the third TM cost.

9. The method of claim 1, further comprising:
determining a plurality of BCW weights comprising:
an initial BCW weight;
a first BCW weight that is immediately lower than the initial BCW weight in a list of candidate BCW weights; and
a second BCW weight that is immediately higher than the initial BCW weight in the list of candidate BCW weights.

10. The method of claim 1, wherein a third TM cost is based on a first reference block associated with the CU.

11. The method of claim 1, wherein the first color component comprises a luma block of the CU and the second color component comprises a chroma block of the CU.

12. The method of claim 1, wherein:
the first color component comprises one of a red color block, a green color block, or a blue color block of the CU;
the second color component comprises one of a red color block, a green color block, or a blue color block of the CU; and
the second color component is different than the first color component.

13. A method, comprising:
determining, by a computing device and based on a first reference block associated with a coding unit (CU), a template matching (TM) cost for the CU based on two or more color components, wherein the CU is associated with content;
determining, based on the determined TM cost, a bidirectional prediction with coding unit weights (BCW) weight for use in predicting the CU; and
decoding the CU based on a prediction block determined using the determined BCW weight.

14. The method of claim 13, wherein at least one of a first TM cost and a second TM cost is determined using a sum of absolute differences (SAD).

15. The method of claim 14, further comprising:
determining the sum of absolute differences (SAD) based on:
a template of at least one of a first color component and a second color component of the CU; and
a template of the first reference block associated with the CU.

16. The method of claim 13, wherein the determining the BCW weight for predicting the CU comprises:
determining the BCW weight based on the determined TM cost and a second TM cost.

17. The method of claim 13, further comprising:
based on respective similarities between each of the first reference block and a second reference block, and a current block of the CU, determining respective weighting factors for the first reference block and the second reference block.

18. A method comprising:
determining, by a computing device, a template matching (TM) cost for a coding unit (CU), associated with content, based on:
a first TM cost associated with a luma block of the CU; and
a second TM cost associated with a chroma block of the CU; and
determining, based on the determined TM cost, a bidirectional prediction with coding unit weights (BCW) weight for predicting the CU.

19. The method of claim 18, wherein the chroma block comprises a Cb or a Cr block.

20. The method of claim 18, wherein the luma block and the chroma block are collocated.

* * * * *